US010272329B2

(12) United States Patent
Linder et al.

(10) Patent No.: US 10,272,329 B2
(45) Date of Patent: Apr. 30, 2019

(54) COOPERATIVE IMMERSIVE LIVE ACTION 360-DEGREE VIDEO AND VIRTUAL REALITY

(71) Applicant: Google Inc., Mountain View, CA (US)

(72) Inventors: David Linder, New York, NY (US); Scott D. Lange, Birmingham, MI (US); Alexander Rothera, Chicago, IL (US)

(73) Assignee: GOOGLE LLC, Mountain View, CA (US)

( * ) Notice: Subject to any disclaimer, the term of this patent is extended or adjusted under 35 U.S.C. 154(b) by 118 days.

(21) Appl. No.: 15/233,904

(22) Filed: Aug. 10, 2016

(65) Prior Publication Data

US 2018/0043249 A1 Feb. 15, 2018

(51) Int. Cl.

*G06F 3/01* (2006.01)
*G06F 15/16* (2006.01)

(Continued)

(52) U.S. Cl.

CPC ............ *A63F 13/25* (2014.09); *A63F 13/211* (2014.09); *A63F 13/213* (2014.09); *A63F 13/24* (2014.09); *A63F 13/32* (2014.09); *A63F 13/335* (2014.09); *A63F 13/35* (2014.09); *A63F 13/47* (2014.09); *G02B 27/01* (2013.01); *G06F 17/3082* (2013.01); *G06F 17/30831* (2013.01); *G11B 27/031* (2013.01); *A63F 2300/105* (2013.01); *A63F 2300/1087* (2013.01); *A63F 2300/407* (2013.01); *A63F 2300/66* (2013.01); *A63F 2300/6661* (2013.01); *A63F 2300/6676* (2013.01); *A63F 2300/8082* (2013.01);

(Continued)

(58) Field of Classification Search

None

See application file for complete search history.

(56) References Cited

U.S. PATENT DOCUMENTS

2002/0082063 A1* 6/2002 Miyaki .................. A63F 13/10 463/1
2007/0060345 A1* 3/2007 Edwards ................ A63F 13/10 463/31

(Continued)

OTHER PUBLICATIONS

Lance Akiro "Gear VR Walk through: Please Don't Touch Anything—All 30 Endings", Youtube, Jul. 6, 2016 (Jul. 6, 2016), p. 1 pp., Retrieved from the Internet: URL: https://www.youtube.com/watch?v=FqpxkGolfE Retreived on Oct. 25, 2017. 1 page.

(Continued)

*Primary Examiner* — James S McClellan
*Assistant Examiner* — Syvila Weatherford
(74) *Attorney, Agent, or Firm* — Lowenstein Sandler LLP

(57) ABSTRACT

A design for a cooperative live action virtual reality experience is described. A client makes use of a 360-degree display unit to play a 360-degree video file, a corresponding audio file, and an annotation requesting the user to make a selection that will dictate the progression of the virtual reality experience. The user input is processed in view of a script tree to determine the subsequent 360-degree video, audio, and annotation to send to the client. In some embodiments, progression of the virtual reality experience is dictated by annotation selections made by a second user or by both users who are cooperatively participating in the virtual reality experience.

17 Claims, 25 Drawing Sheets

(51) Int. Cl.

| | |
|---|---|
| ***G02B 27/01*** | (2006.01) |
| ***H04N 13/00*** | (2018.01) |
| ***A63F 13/25*** | (2014.01) |
| ***A63F 13/211*** | (2014.01) |
| ***A63F 13/213*** | (2014.01) |
| ***A63F 13/24*** | (2014.01) |
| ***A63F 13/32*** | (2014.01) |
| ***A63F 13/335*** | (2014.01) |
| ***A63F 13/35*** | (2014.01) |
| ***G06F 17/30*** | (2006.01) |
| ***G11B 27/031*** | (2006.01) |
| ***A63F 13/47*** | (2014.01) |

(52) U.S. Cl.

CPC ................ *G06F 3/01* (2013.01); *G06F 15/16* (2013.01); *H04N 13/00* (2013.01)

(56) References Cited

U.S. PATENT DOCUMENTS

| | | | | |
|---|---|---|---|---|
| 2010/0227685 | A1* | 9/2010 | Mori ...................... | A63F 13/10 463/30 |
| 2013/0196757 | A1* | 8/2013 | Latta .................... | A63F 13/211 463/31 |
| 2016/0093108 | A1* | 3/2016 | Mao ........................ | A63F 13/42 345/633 |
| 2016/0191893 | A1 | 6/2016 | Gewickey et al. | |

OTHER PUBLICATIONS

PCT Search Report & Written Opinion, Re: Application #PCT/US2017/046380 dated Nov. 6, 2017. 6 pages.

* cited by examiner

FIG. 5L

COOPERATIVE IMMERSIVE LIVE ACTION 360-DEGREE VIDEO AND VIRTUAL REALITY

BACKGROUND

Field of Art

This application relates generally to interactive and collaborative features of 360-degree videos, and in particular to creating a shared 360-degree interactive gaming experience.

Description of the Related Art

Conventional web-based systems for the storage and playback of digital video files typically only support traditional playback of a video, in which the video progresses in a linear fashion without input from the viewer and without the system recognizing and responding to the viewer's movements. Nor do these systems allow multiple users to share the digital video experience from separate perspectives, instead providing a sole perspective for playback to multiple users.

Virtual reality systems immerse their users in a 360-degree environment, allowing users to experience the displayed content as if they were present in the virtual reality. While traditional virtual reality systems foster the immersive experience by occupying the user's entire field of view, and may allow user engagement in the form of video games, they are traditionally not compatible with videos and instead rely on dynamically generated audio/visual content.

SUMMARY

A method, system, and computer program product disclose creating a cooperative live action virtual reality experience, allowing multiple users to participate simultaneously in the creation of a single interactive story from different perspectives. The story may be viewed on multiple clients, each associated with a 360-degree display unit. A user of a first client sends a request to a second client to initiate the virtual reality experience ("2-player mode"). Responsive to the user of the first client sending the request, the system accesses a first 360-degree media segment comprising a 360-degree video file, an audio file, and an annotation. The system displays the first 360-degree media segment on the first client and receives input from the first user in response to the annotation. Responsive to the first user providing the input, the system accesses a second 360-degree media segment corresponding to the annotation selection. The system then presents the second 360-degree media segment on the first client. Responsive to the first user providing input in response to the second annotation, the system accesses and displays a third 360-degree media segment. In other embodiments, the system accesses a 360-degree media segment responsive to input from the second user or from both the first user and the second user.

In another embodiment, a single user uses the client to send the request to initiate the virtual reality experience to a server ("1-player mode"). When the user of the client downloads the application, all of the 360-degree media segments stored in a video database and an annotation database on the server are included in the download and stored on the client, such that the client need not be connected to a network to begin playback of the 360-degree media segment. In instances where a player selects 1-player mode, all subsequent annotation selections are made by the user of the client. Alternatively, some of the annotations are made automatically by the computer. While both 1-player and 2-player modes are contemplated, the following description addresses the 2-player iteration only. It will be apparent to one of ordinary skill in the art that unless otherwise noted, the same functionality applies to the 1-player mode.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (and method) for purposes of illustration only. One skilled in the art will readily recognize from the following description that alternative embodiments of the structures and methods illustrated herein may be employed without departing from the principles described herein.

Exemplary System

Figure 1:
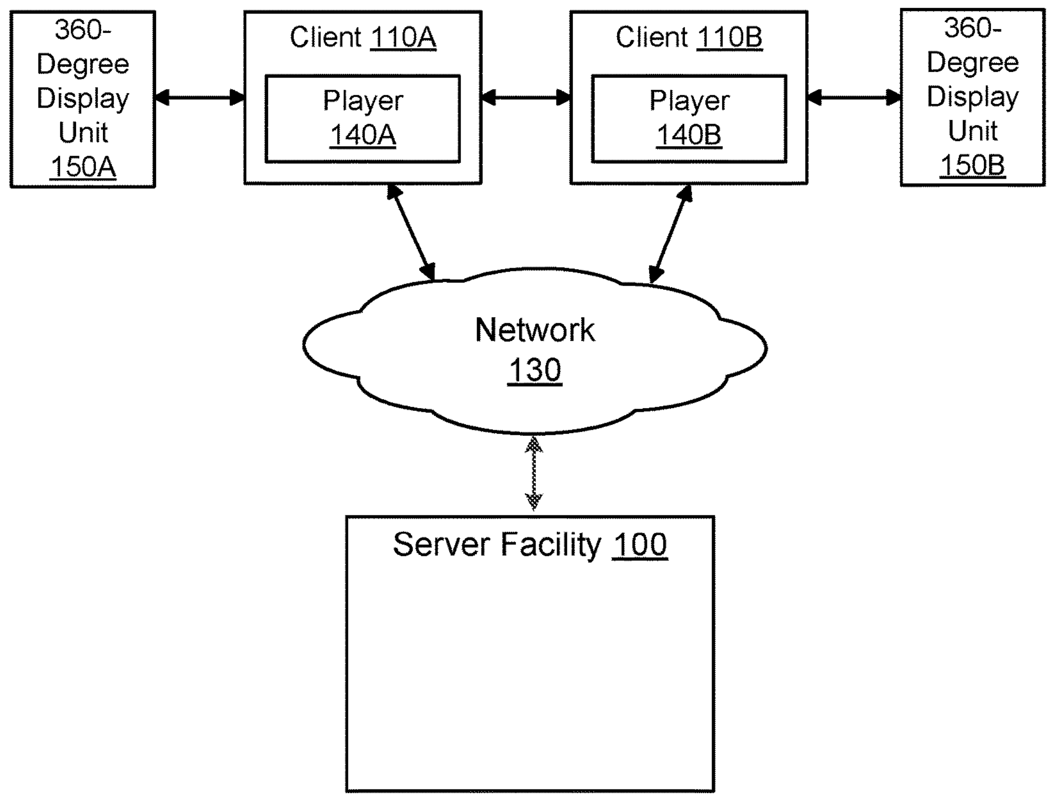
FIG. 1 is a block diagram of a system architecture for creating a cooperative live action virtual reality experience, in accordance with an embodiment.

FIG. 1 is a block diagram illustrating a system for creating a cooperative live action virtual reality experience. Multiple users use the clients 110A-B to interact with a server facility 100. While only two clients 110A and 110B are shown, it is understood that very large numbers (e.g., millions) of clients are supported and can be in communication with the server facility 100 at any time. For two clients 110 sharing a virtual reality experience, the client 110A may use web sockets to establish a connection with the client 110B over a network 130 and to exchange data packets with the client 110B. Alternatively, the client 110A may connect directly to the client 110B using a wired connection or a short range wireless communication standard such as BLUETOOTH or infrared.

The server facility 100 communicates with the clients 110A and 110B via the network 130, which is typically the Internet but may also be any network, including but not limited to a LAN, a MAN, a WAN, a mobile, wired, or wireless network, a private network, or a virtual private network. The client 110 and the server facility 100 are connected to the network 130 through network interfaces.

The client 110 includes a video player 140 and is coupled to a 360-degree display unit 150. Although not shown in FIG. 1, the client 110 also typically includes a processor, a display device (or output to a display device), a local storage, such as a hard drive or flash memory device, to which the client 110 stores data used by the user in performing tasks, and a network interface for coupling to the server facility 100 via the network 130.

The client 110 may include a variety of different computing devices. Examples of clients 110 are personal computers, digital assistants, personal digital assistants, cellular phones, mobile phones, smartphones, or laptop computers. As will be obvious to one of ordinary skill in the art, the present invention is not limited to the devices listed above. In one embodiment, the client 110 also includes a voice recognition component that detects and interprets user selection in response to auditory input from the user of the client 110.

The 360-degree display unit 150 displays a 360-degree video in a 360-degree display format, sometimes also referred to as "spherical video" or "immersive video." A 360-degree video is a video recording captured by simultaneously recording a view in every direction. Often this is accomplished using an omnidirectional camera or a collection of particularly positioned cameras, however there are expected to be other ways of recording the 360-degree video, particularly in the future. During playback, the user of the client 110 is able to control the viewing direction, so that they may choose to look in any direction similar to a panorama, and the 360-degree display unit 150 will accommodate that choice and show the appropriate direction of the recorded video. In one embodiment, the 360-degree video is also a three-dimensional (3D) video and allows 3D visualization of content (i.e. depth of field, moving through, or perception of a z-axis).

The 360-degree display unit 150 may also be, in conjunction with a visual enclosure provided by the 360-degree display unit 150, the complete extent of what the user is able to see such that they are fully visually immersed. That is, in some implementations, all the user will be able to see is the 360-degree video, with the remainder of their range of vision blocked by the 360-degree display unit 150. The 360-degree display unit 150 may similarly include audio speakers to allow the user to listen to audio that is associated with the 360-degree video. The audio hardware of the 360-degree display unit 150 may be set up to play back stereo in stereo or surround (e.g., 5 or more speaker source) format.

The experience implemented for the user of the client 110 and 360-degree display unit 150 may also be referred to as a "virtual reality experience", as the visual and auditory media simulate a user's physical presence and environment to create an artificial sensory experience for the user and allow for user interaction. Consequently, the term "virtual reality experience" is used throughout this description to generally describe the experience. However, in various specific embodiments, the experience may be implemented with just a 360-degree video, or it may be a more complete virtual reality experience.

In one embodiment, the 360-degree display unit 150 is part of the same physical unit as the client 110 Alternatively, the 360-degree display unit 150 is a standalone unit that is communicatively coupled, in a wired or wireless manner, to the client 110. An example of a 360-degree display unit 150 is the GOOGLE CARDBOARD unit; however other 360-degree display units are also suitable and can be adapted to operate according to the teachings disclosed herein.

The 360-degree display unit 150 detects user input and communicates the input to the server facility 100 for analysis. User input may be received in the form of physical motion of the 360-degree display unit 150 caused by the user. User input may also be received from a joystick or other controller held in the user's hand(s).

The video player 140 is used to control the presentation of a 360-degree video and associated audio, to control presentation of text or audio annotations that are a part of the 360-degree experience. A 360-degree video, audio, and annotation combination is herein referred to as a 360-degree media segment. The video player 140 is further used to control the sending and receiving of instructions related to the control of the virtual reality experience. The video player 140 may be implemented in hardware, or a combination of hardware or software. The video player 140 may be a standalone software application, or a plug-in to another software application. The video player 140 is configured to cause the 360-degree display unit 150 to play back 360-degree video files and audio files retrieved from the server facility 100 or stored within the client 110. When the video player 140 reaches the time in the 360-degree video to which an annotation associated with a 360-degree video applies, the video player 140 causes the annotation to be presented by having the 360-degree display unit 150 overlay the annotation on the display screen and/or overlay an audio annotation on the audio track of the 360-degree video or audio file.

The video player 140 also includes user interface controls, and in some instances corresponding application programming interfaces, allowing selection through input at the 360-degree display unit of a 360-degree video, starting, stopping, rewinding, fast forwarding, and otherwise navigating through a 360-degree video. Other types of user controls (e.g., buttons, keyboard controls) can be used as well to control the playback and video format selection functionality of the video player 140. The video player 140 also processes input via joystick or motion of the 360-degree display unit 150 to guide choices as the user navigates through the virtual reality experience.

The server facility 100 facilitates the ability of the clients 110A and 110B to connect with each other to participate in the cooperative live action virtual reality experience by providing 360-degree media segments as dictated by received annotation selections based on user input, and as dictated by the logical flow of the virtual reality experience as described further below. In some instances, 360-degree media segments will not need to be provided directly to the clients 110 where those segments are already stored on the clients 110 locally.

Organizational Structure of a Virtual Reality Experience

Each 360-degree media segment contains a video, audio, and an annotation requesting that one or more of the users of the clients 110A and 110B make decisions, herein referred to as annotation selections, that will dictate the progression of the experience. When one of the users makes an annotation selection by providing an input, for example by moving the 360-degree display unit 150, a user selection module 122 located either in the server facility 100 or the client 110 interprets the user selection and instructs one or more of the video players 140 of the clients 110 involved in the experience to load or obtain the 360-degree media segment associated with that selection. For example, a 360-degree media segment might contain video and audio files in which the player associated with the client 110 is sitting in the driver's seat of a car and an annotation asking the user to choose whether to turn the car right or left. If the user of the client 110 selects the "left" option (i.e., the left annotation selection), the 360-degree display unit 150 will detect the input and communicate the input to the user selection module 122, which will instruct the video player 140 to load the 360-degree media segment associated with the selection.

As introduced above, the annotations can be displayed in the form of an interactive graphical interface overlaid on a displayed 360-degree video. For example, they make take the form of a menu style interface, in which the 360-degree display unit 150 displays several choices via the annotations, and then pauses the video to allow the user to select one of the choices. The menu items/annotations allow for branching storylines in the virtual reality experience, where selecting one annotation leads to one 360-degree media segment, and clicking on a different annotation leads to a different 360-degree media segment. For example, annotations could be used in a game in which a user selects annotations indicating various forks in a storyline of a 360-degree media segment. If a makes a first annotation selection, the user selection module 122 accesses a first 360-degree media segment from the server facility 100. If a user makes a second annotation selection, the user selection module 122 accesses a second 360-degree video from the server facility 100. Such a game is supported by multiple 360-degree media segments, each representing the destination of various jumps. Each jump in the game is represented as an entry in an organized hierarchical structure.

Figure 2A:
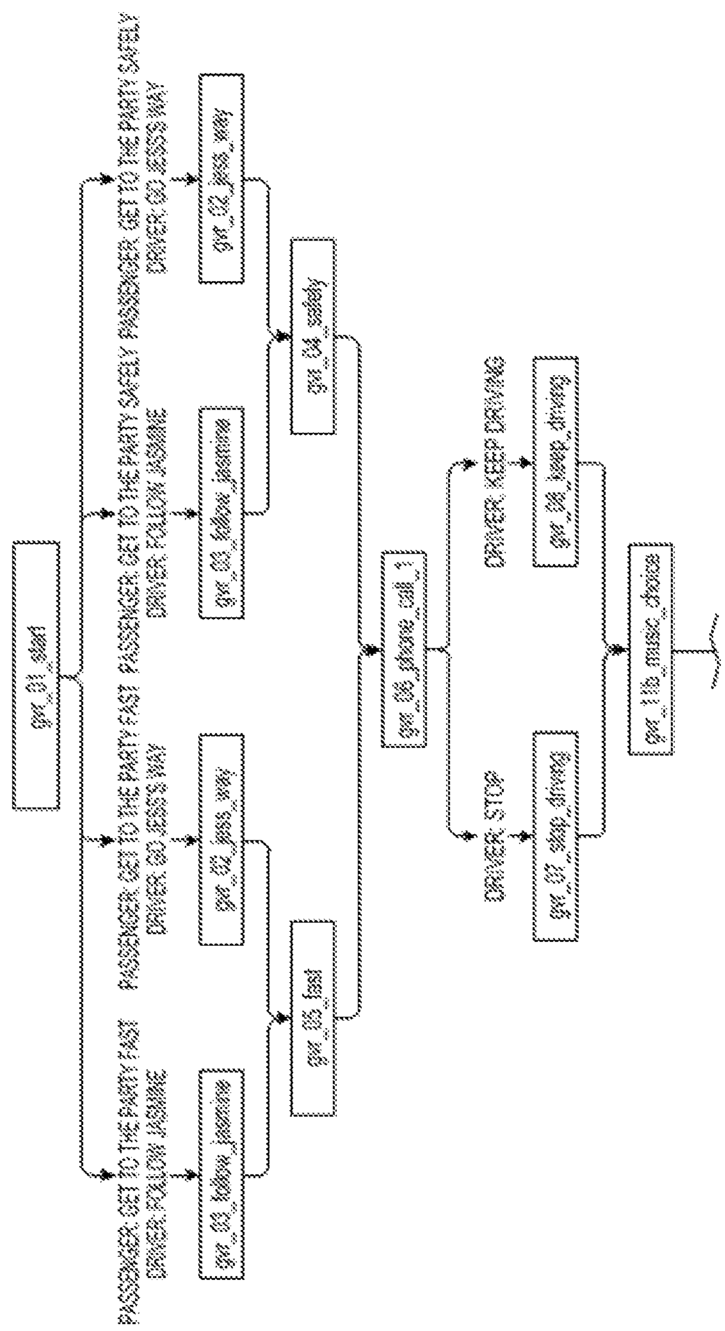
FIGS. 2A-2C show an example script tree that organizes the cooperative live action virtual reality experience based on user input responsive to annotations, in accordance with an embodiment.
Figure 2B:
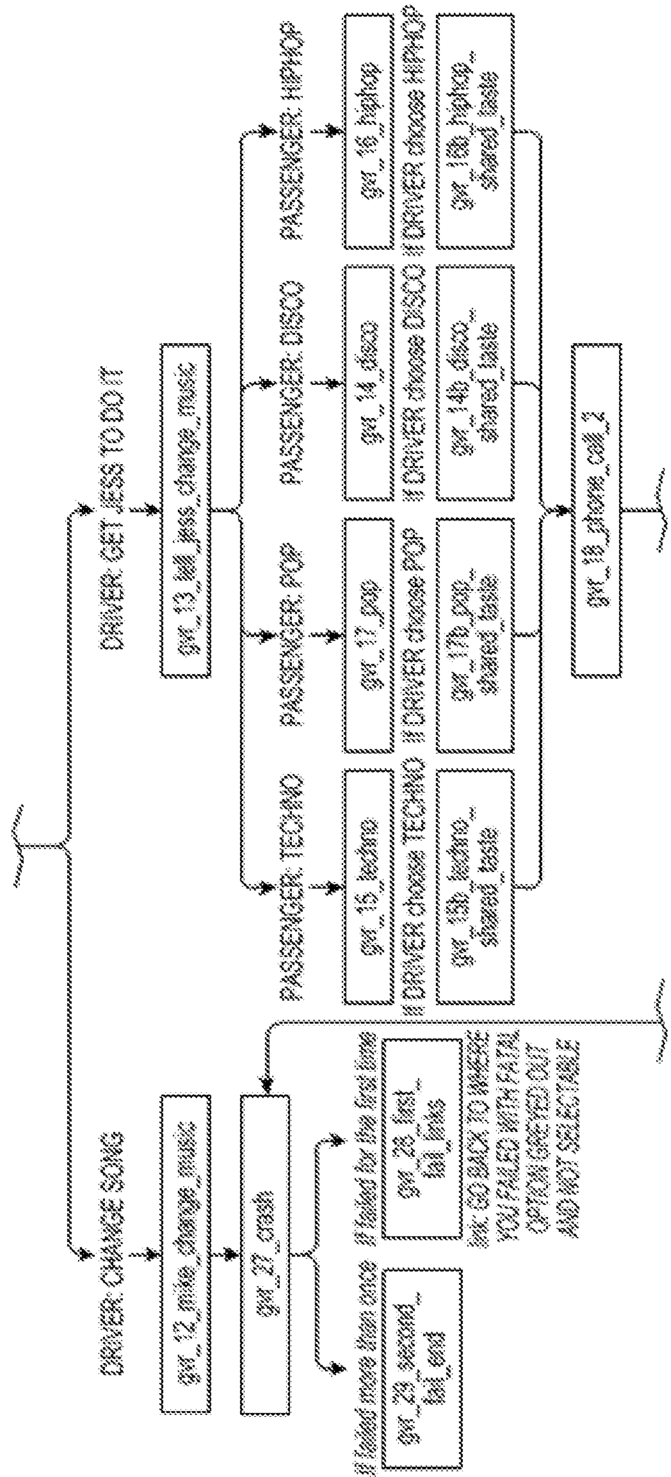
Figure 2C:
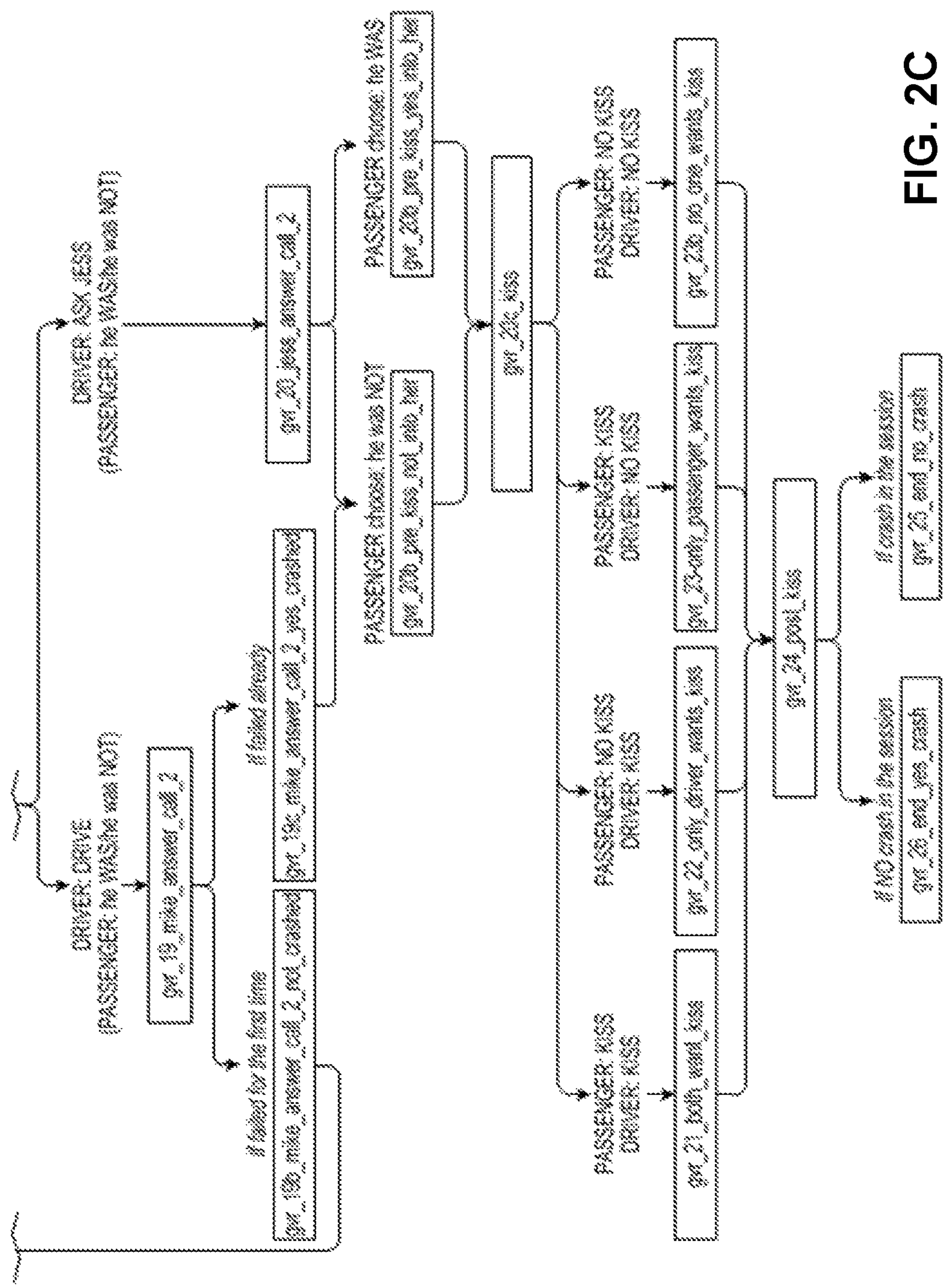

FIGS. 2A-2C show an example script tree illustrating a set of 360-degree media segments organized and linked in the hierarchical structure. The script tree organizes the virtual reality experience. The script tree contains a series of nodes connected by a series of edges. At any given point during the experience, the script tree dictates that a given video player 140 play back a given 360-degree media segment corresponding to each node in the script tree. Based on an annotation selection received at one of the clients 110 associated with that 360-degree media segment and node, the user selection module 122 accesses the script tree to determine which outgoing edge and (often child) node will occur next. This in turn dictates which 360-degree media segment is played to each client next, and so on.

The script tree begins with a root node representing the beginning of the cooperative 360-degree virtual reality experience for the users of the clients 110. In one embodiment, the clients 110A and 110B continue to navigate away from the root node until they reach a leaf node. For example, FIGS. 2A-2C illustrate a script tree for a distracted driving public service announcement (PSA). Gvr_29_second_fail_end of FIG. 2B is a leaf node because if the user of the client 110 associated with the driver fails more than once, the virtual reality experience ends. In this way, the virtual reality experience may have a differing logical progression of 360-degree media segments depending upon user choices, and may have corresponding different endings.

Referring back to FIG. 1 and the client 110, the video player 140 includes functionality that uses the script tree structure and the 360-degree media segments to carry out the virtual reality experience for the user. The user selection module 122 displays on the clients 110A and 110B an option to select a player through whose perspective to view the 360-degree media segments. For example, the video player 140 displays on the client 110A a menu allowing the user of the client 110A to decide whether to view the 360-degree media segments as "Jess" or "Mike." If the user of the client 110A selects "Mike," the user of the client 110B will view the 360-degree video as "Jess." In one embodiment, three or more users of clients 110 participate in the cooperative live action virtual reality experience. The first player is a user of a client 110A; additional players may be other users of clients 110 or the computer.

The user selection module 122 receives user input from the video player 140 and compares the input to the script tree to determine which 360-degree media segment to retrieve from the experience database 126 and the annotation database 128 responsive to the input. The user selection module 122 then sends the 360-degree media segment to the video player 140 along with instructions regarding where, of clients 110A and 110B, to send the 360-degree media segment.

The script tree may contain multiple 360-degree media segments per node, and the user selection module 122 may send a different 360-degree media segment to each client 110 (e.g., a different 360-degree media segment for a first client 110A vs. a second client 110B) depending upon the player associated with each respective client 110. When the user selection module 122 reaches a node in the script tree responsive to user input, the user selection module 122 will make a different selection of the appropriate 360-degree media segment for each player such that each player will hear and see different things during the virtual reality experience. Continuing with the example described above, if the user of the client 110A chooses Mike, the user selection module 122 will select, at each node, the 360-degree media segment associated with the Mike player, and similarly for the other client 110B and the Jess player.

In one embodiment, the 360-degree display unit 150 detects user input responsive to the user of the client 110 turning the 360-degree display unit 150 to a certain point in the 360 degree field when no annotation is display on the client 110. The 360-degree display unit 150 communicates the input to the user selection module 122, which retrieves a 360-degree media segment from the server facility 100 and directs the video player 140 to play the 360-degree media segment.

The script tree may also provide a node/edge structure that allows users to loop back to an earlier point in the cooperative live action virtual reality experience responsive to appropriate selection of annotation selections that cause such a loop to occur based on edge connections between nodes.

For example, assume that a user of the client 110 chooses a murder mystery virtual reality experience from an experience database 126, where the object of the virtual reality experience is to search a house to find clues that the user can use to catch a murderer. Playback of the murder mystery experience begins at the root node and navigates edges and nodes down the script tree responsive to the user selecting annotation options that dictate the direction of the story. In one example, the client 110 displays an annotation asking the user of the client 110 to choose whether to walk into the library or the kitchen. The user of the client 110 turns the 360-degree display unit 150 indicating selection of the "Library" annotation. Responsive to the annotation selection, the user selection module 122 follows the edge associated with the "Library" node and instructs the video player 140 to play a 360-degree media segment in which the player associated with the user opens a door and walks into the library. When the player walks into the library, the video player 140 displays an annotation asking the user to choose whether to search on the desk or in the trash can for clues. The user of the client 110 turns the 360-degree display unit 150 indicating selection of the "Desk" annotation. Responsive to the annotation selection, the user selection module 122 follows the edge associated with the "Desk" node and instructs the video player 140 to play a 360-degree media segment in which the player walks over to the desk and searches for clues. When the video player 140 determines that the player has finished searching the desk, the video player 140 follows a looped edge node and returns the user of the client 110 to the earlier 360-degree media segment in which the user was asked to choose between searching the desk and searching the trash can. Returning the user to this point of the story allows the user to select a previously unselected annotation to alter the progression of the storyline. Alternatively, the user may make a previous annotation selection again to repeat some aspect of the experience. The video player 140 can similarly employ loops to allow the user to search different rooms or floors of the house and navigate down the script tree to leaf nodes associated with the user solving or failing to solve the mystery.

Server Facility

Figure 3:
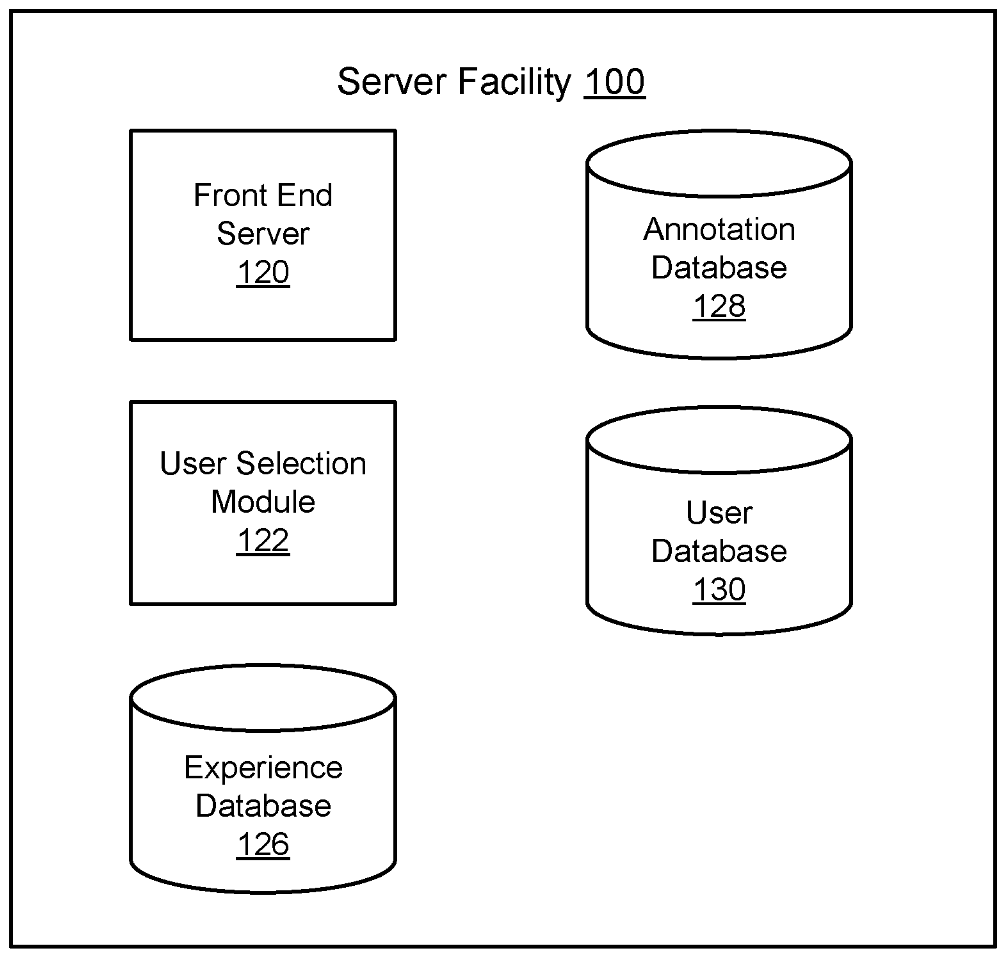
FIG. 3 is a block diagram illustrating a server facility designed to allow users to connect to each other to participate in the virtual reality experience, in accordance with an embodiment.

FIG. 3 is a block diagram of a server facility 100 of a system for creating a cooperative 360-degree virtual reality experience. As illustrated in FIG. 3, the server facility 100 includes a front end server 120, a user selection module 122, an experience database 126, an annotation database 128, and a user database 130. Other conventional features, such as firewalls, load balancers, application servers, failover servers, site management tools, and so forth are not shown as to more clearly illustrate the features of the system. Examples of a suitable server facility 100 for implementation of the system include the YouTube™ and Google Video™ websites; other video hosting sites are known as well, and can be adapted to operate according to the teaching disclosed herein. It will be understood that the term "website" represents any system and method of providing content and is not intended to be limited to systems that support content provided via the Internet or the HTTP protocol. The various servers are conventionally implemented, whether as a single piece of software or hardware or as multiple pieces of software or hardware and can couple to the network 130 via the front end server 120. In general, functions described in one embodiment as being performed on the server side can also be performed on the client side in other embodiments if appropriate.

The front end server 120 allows the user of the client 110 to connect with users of other clients to begin a virtual reality experience. The front end server 120 displays on the client 110A a list of the other users, and receives a selection from the user of the client 110A of another user and corresponding client 110B. The front end server 120 may then cause a request to be made to begin the virtual reality experience. In one embodiment, the request includes a code that a user must input to the client 110B to join a virtual reality experience started by another user.

The experience database 126 is used to store 360-degree media segments and associated metadata associated with 360-degree media segments. The 360-degree video and audio files have metadata associated with each file, such as a video ID, video title, label, and time length. The 360-degree media segments in the experience database 126 may be obtained from a variety of sources. Generally, they will be obtained for storage in the experience database 126 in groups along with a corresponding script tree that together represent a cohesive virtual reality experience.

The annotation database 128 stores annotations associated with the 360-degree media segments and possible annotation selections permitted by the script tree. The annotation database 128 maintains an association between each annotation and the appropriate portion of the annotated 360-degree video. In one embodiment, for example, the annotation database 128 stores an identifier of the annotation type (e.g., a text box) along with any information associated with that type (e.g., a text caption), a time stamp(s) of the 360-degree video to which the annotation applies (e.g., from time 01:05 to time 01:26), and an identifier of the 360-degree video that the annotation annotates.

The user database 130 maintains a record of users associated with virtual reality experiences. Each individual user is assigned a user ID. The user ID can be based on any identifying information, such as the user's IP address, user name, or the like. The user database 130 may contain, for a given user, a list of identities of other users who are considered connections of the user for purposes of facilitating a user's ability to start new virtual reality experiences with other users.

Example Process and Use Case

Figure 4:
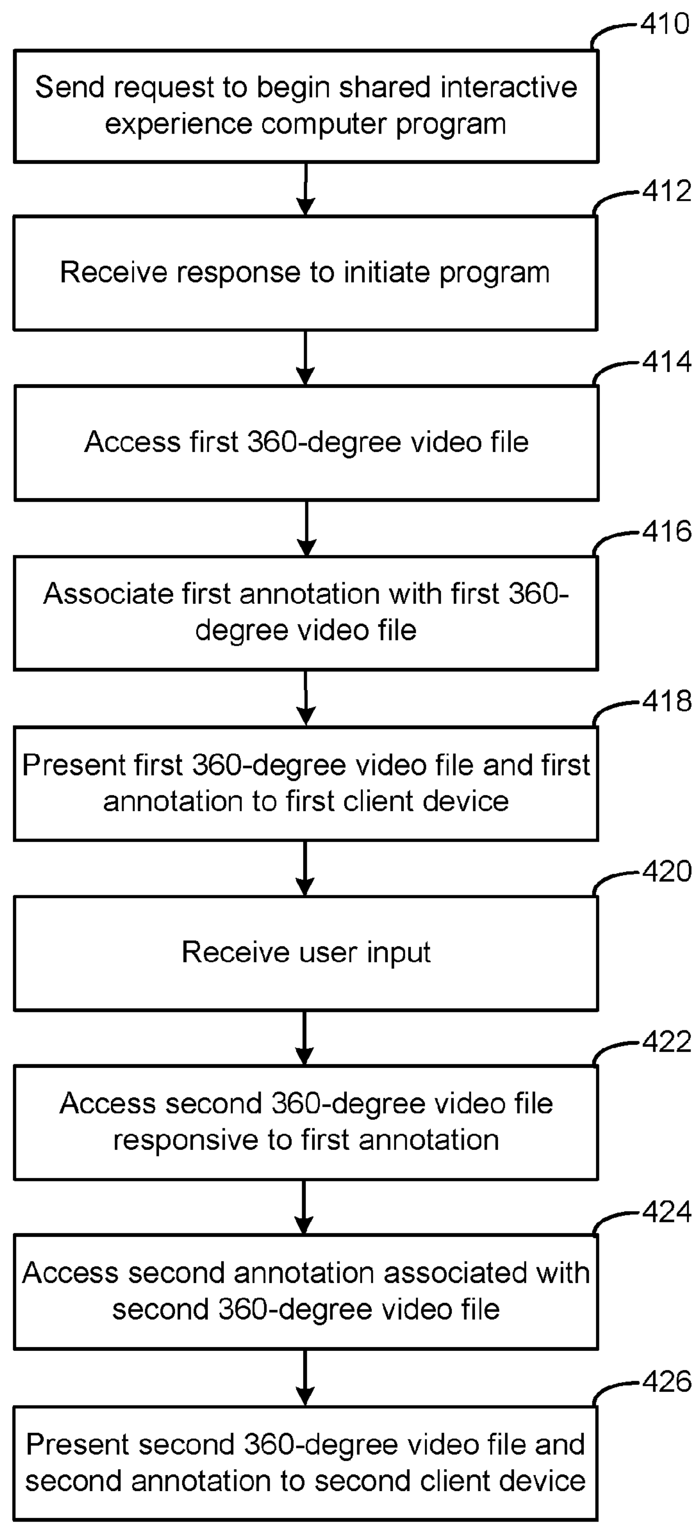
FIG. 4 is a flow chart illustrating an example process for creating a cooperative live action virtual reality experience, in accordance with an embodiment.

FIG. 4 is a flow chart showing an example process for creating a cooperative live action virtual reality experience, in accordance with an embodiment. The exemplary process is demonstrated in a use case illustrated in FIGS. 5A-5S.

Assume that Sean owns a mobile device (the client 110A) and a 360-degree display unit 150A that is communicatively coupled to his mobile device. Sean opens the application and selects, through the front-end server 120, a distracted driving PSA from the list of available 360-degree video files in the experience database 126. The client 110A sends a request 410 to the server facility 100 to begin the virtual reality experience. At 412, the client 110A receives from the server facility 100 a response to initiate the selected program.

Figure 5A:
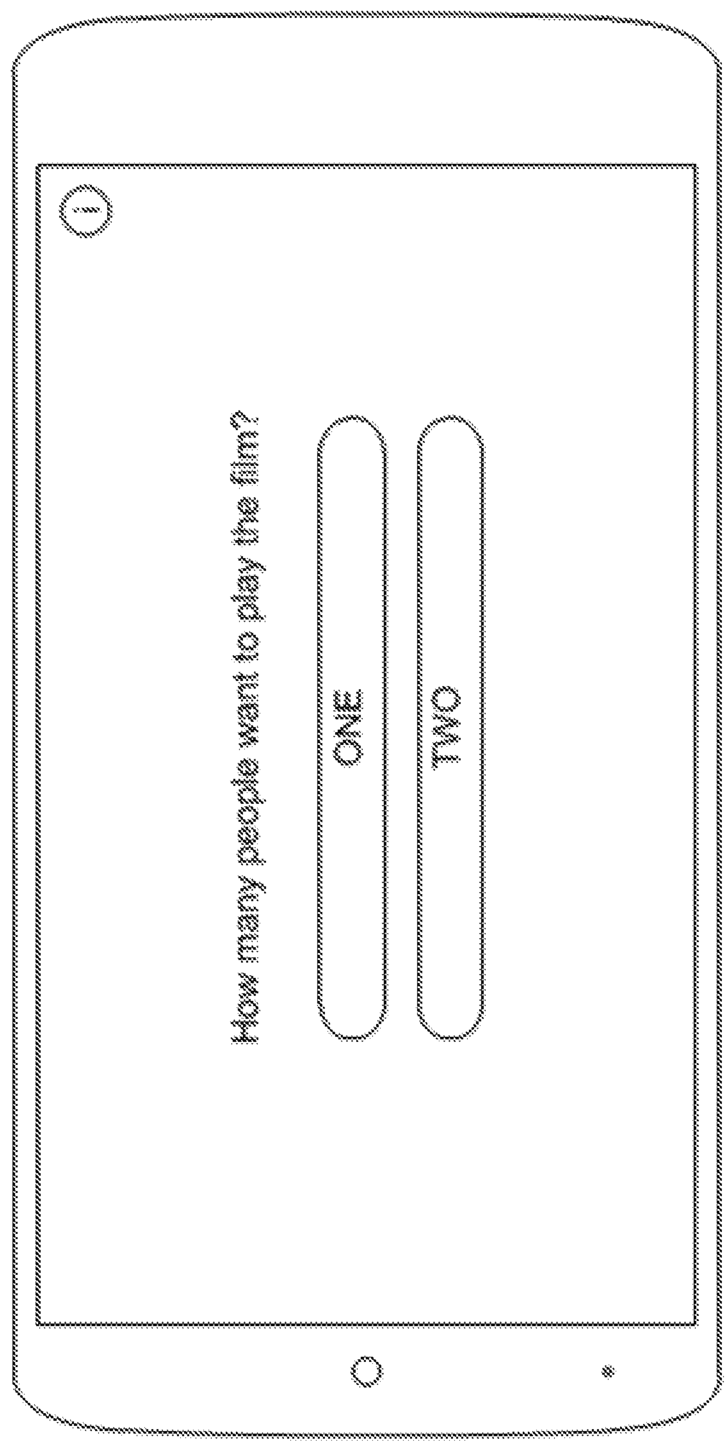
FIGS. 5A-5S show an use case for the exemplary method described in FIG. 4.
Figure 5B:
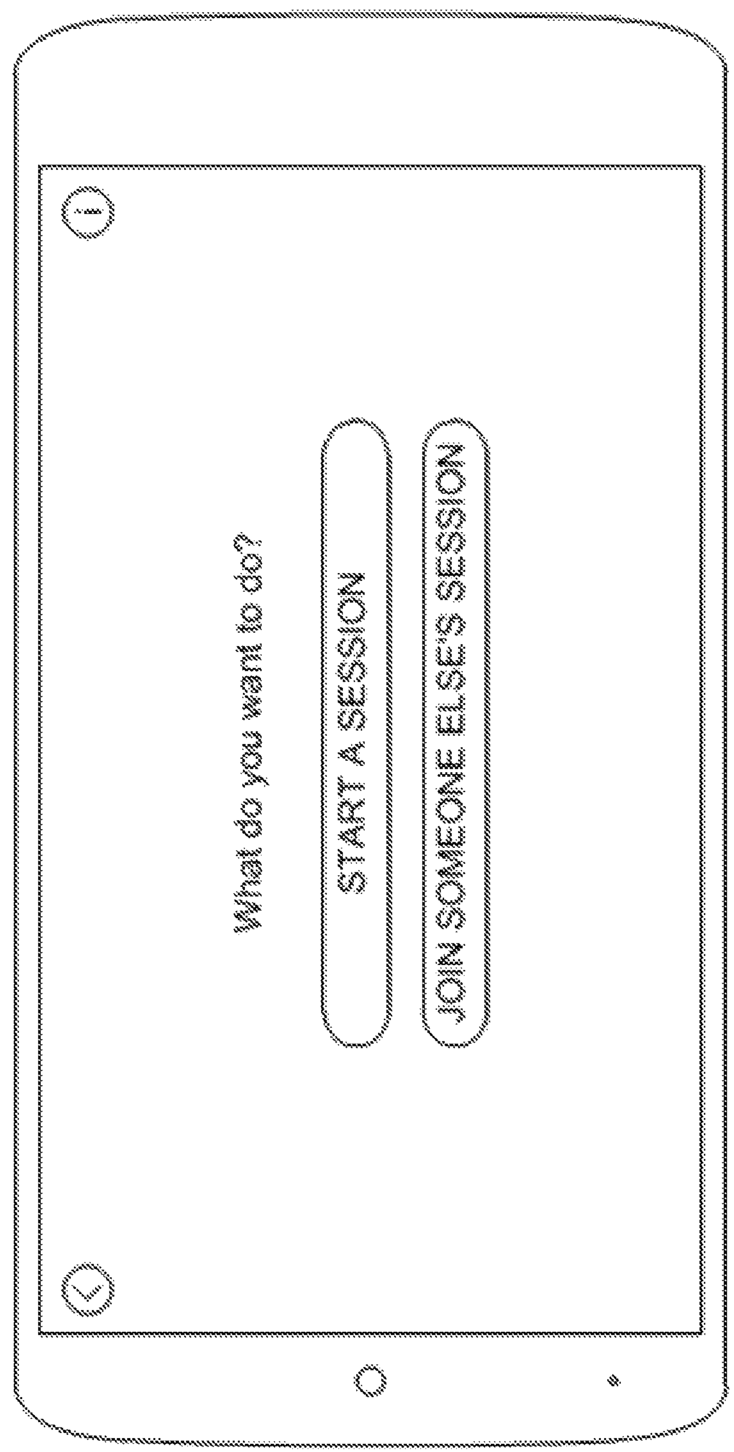

Turning to FIG. 5A, Sean is asked how many people want to participate in the experience, and he selects two. Sean is next asked, in FIG. 5B, whether he wants to start a new session or join someone else's session. Sean selects "Start New Session" and is presented with a list of his connections that are included in the user database 130. Sean selects Alison from his list of connections and the front end server 120 displays a code that Alison must enter in order to join the session that Sean created.

Figure 5C:
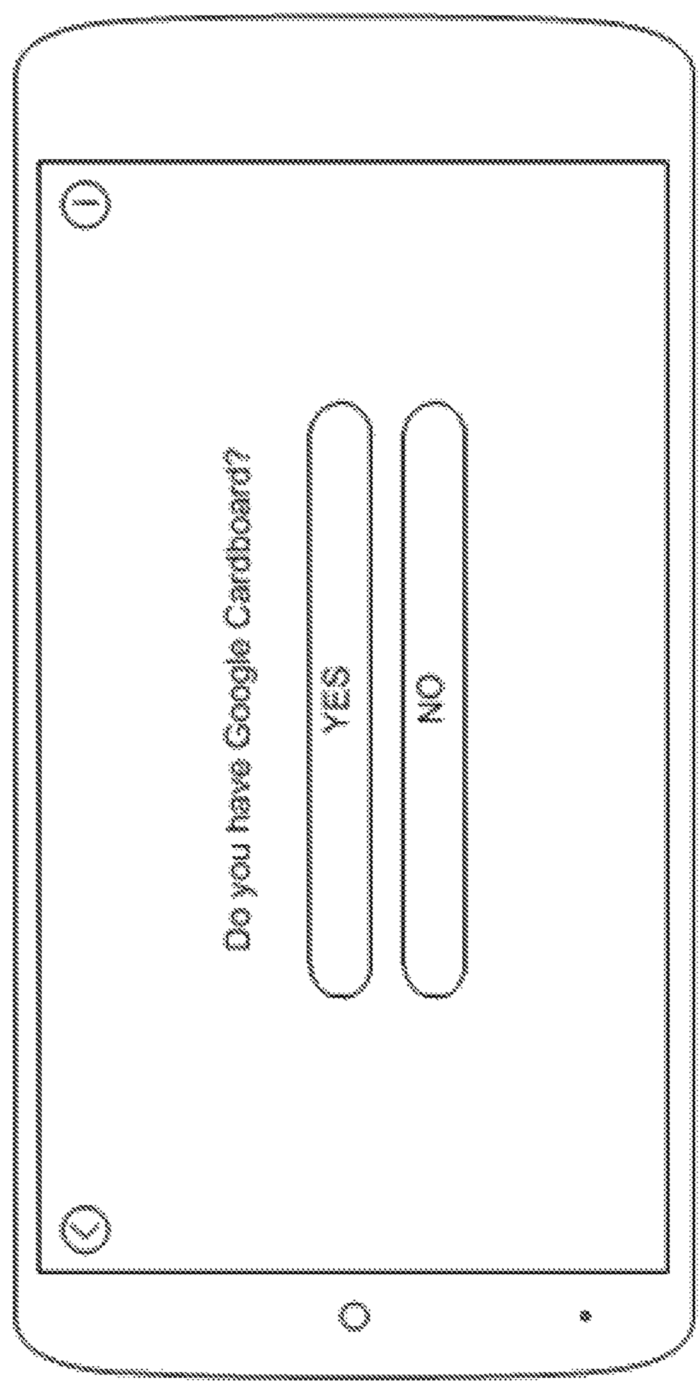
Figure 5D:
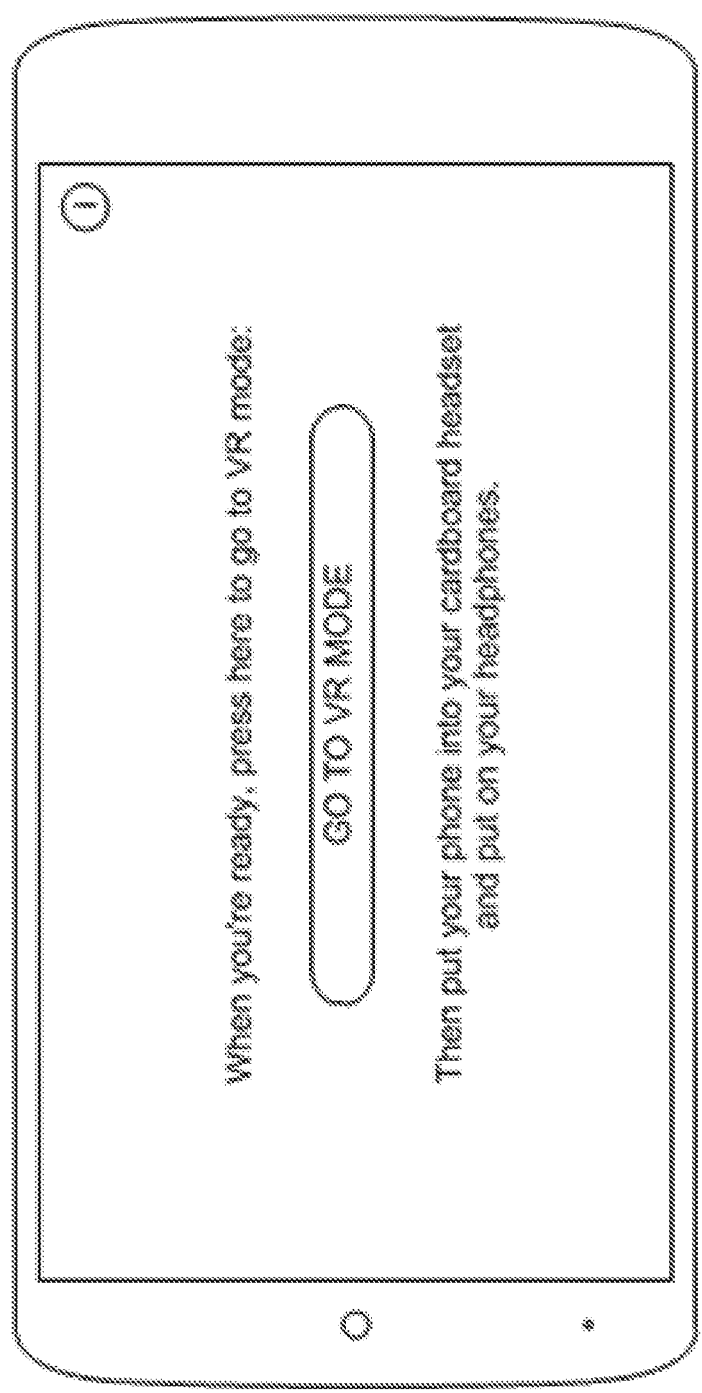

The client 110A uses web sockets to connect to Alison's device (the client 110B) and to send an invitation to the client 110B, which is also coupled to a 360-degree display unit 150B. Responsive to the client 110A sending the invitation to the client 110B, Alison inputs the code to join the session. In FIG. 5C, Sean is asked whether he has Google Cardboard, and he selects "Yes." Sean selects "Go to VR Mode" in FIG. 5D and places the client 110A into the 360-degree display unit 150A to begin playback of the distracted driving PSA.

Returning to FIG. 4, responsive to sending a response to the client 110A to initiate the cooperative live action virtual experience, the user selection module 122 accesses 414 a first 360-degree video file and an associated first audio file from the experience database 126. The user selection module 122 associates 416 a first annotation with the first 360-degree video file and the first audio file and retrieves the first annotation from the annotation database 128. The user selection module 122 then sends the 360-degree media segment containing the 360-degree video file, the associated audio file, and the annotation to the video player 140 for display on the client 110A.

Figure 5E:
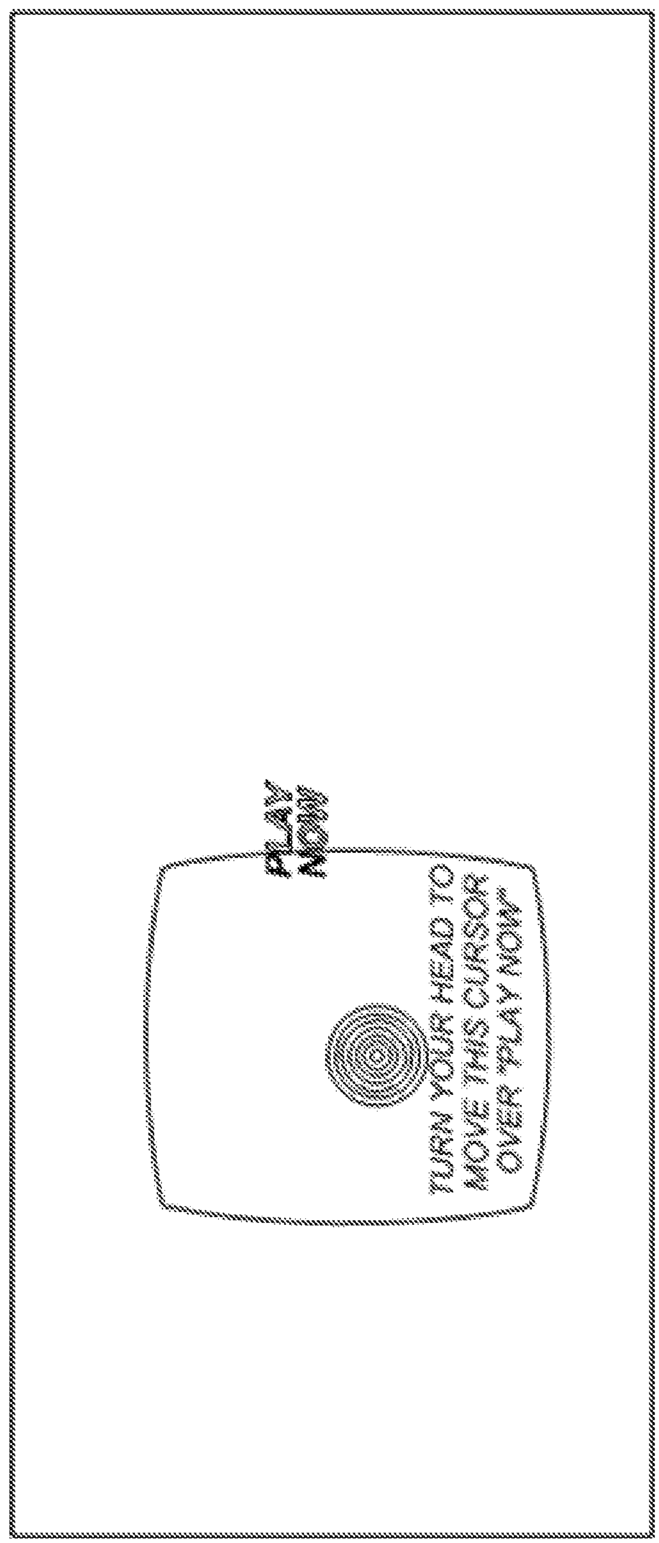
Figure 5F:
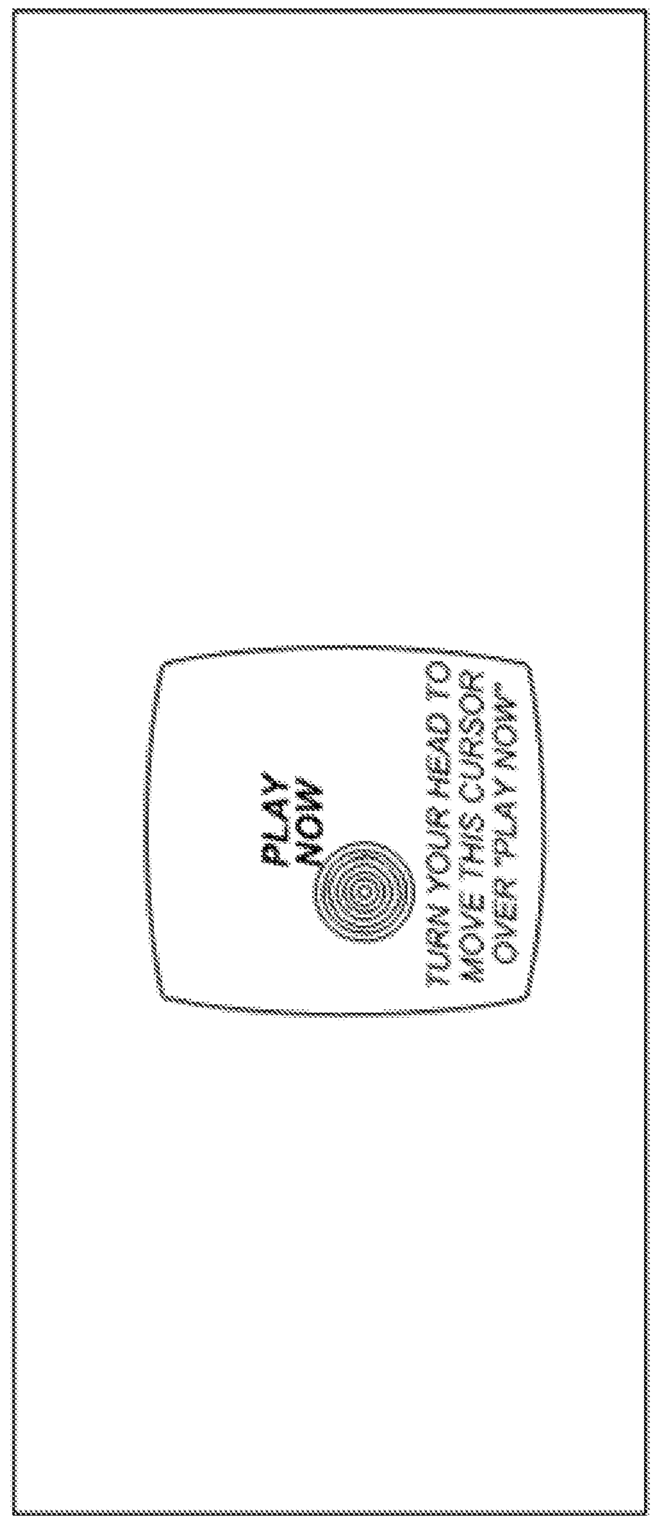
Figure 5G:
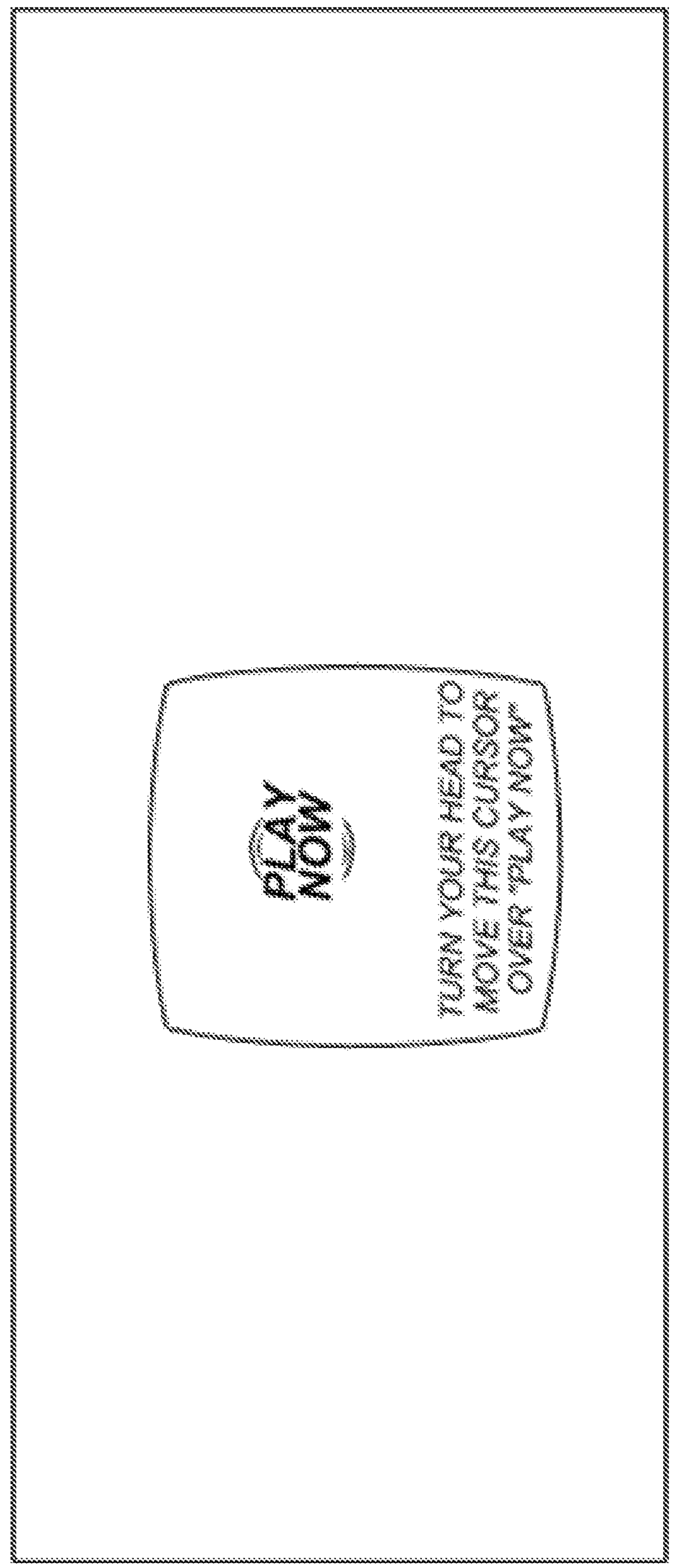

At 418, the video player 140 presents the 360-degree media segment on the 360-degree display unit 150A. In some embodiments, the annotation contains only one annotation option. For example, on the client 110A, the first 360-degree media segment contains instructions to begin playback of the selected video. In FIGS. 5E-5G, Sean provides user input in the form of physical motion of the 360-degree display unit 150A, indicating selection of the "Play Now" annotation. The 360-degree display unit 150A detects the input 420 and communicates the input to the user selection module 122 for interpretation. The user selection module 122 compares the input to the script tree to determine which 360-degree media segment to retrieve from the experience database responsive to the "Play Now" input. The user selection module 422 then retrieves the second 360-degree video file and the associated audio file from the experience database 126 and a second annotation 424 from the annotation database 128. The user selection module 122 then instructs the video player 140A to begin playback of the second 360-degree media segment on the client 110A.

Figure 5H:
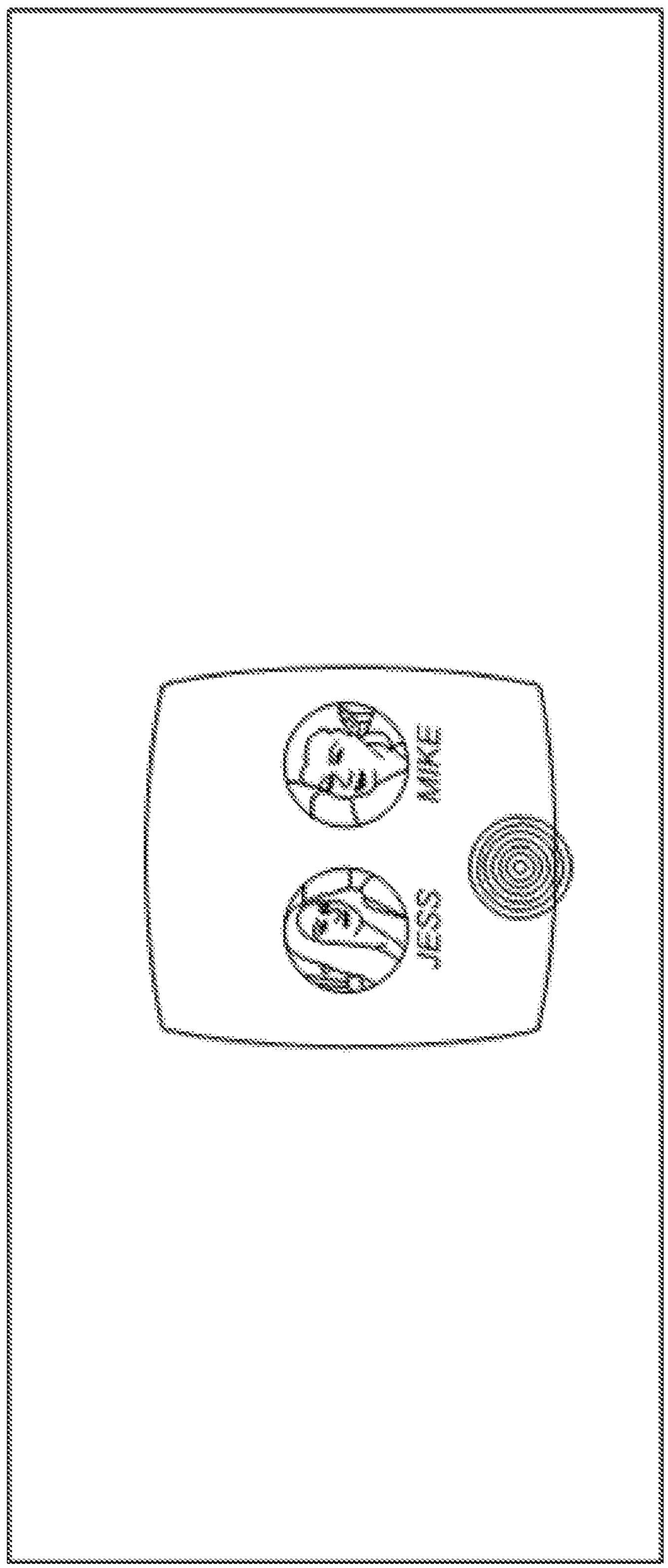
Figure 5I:
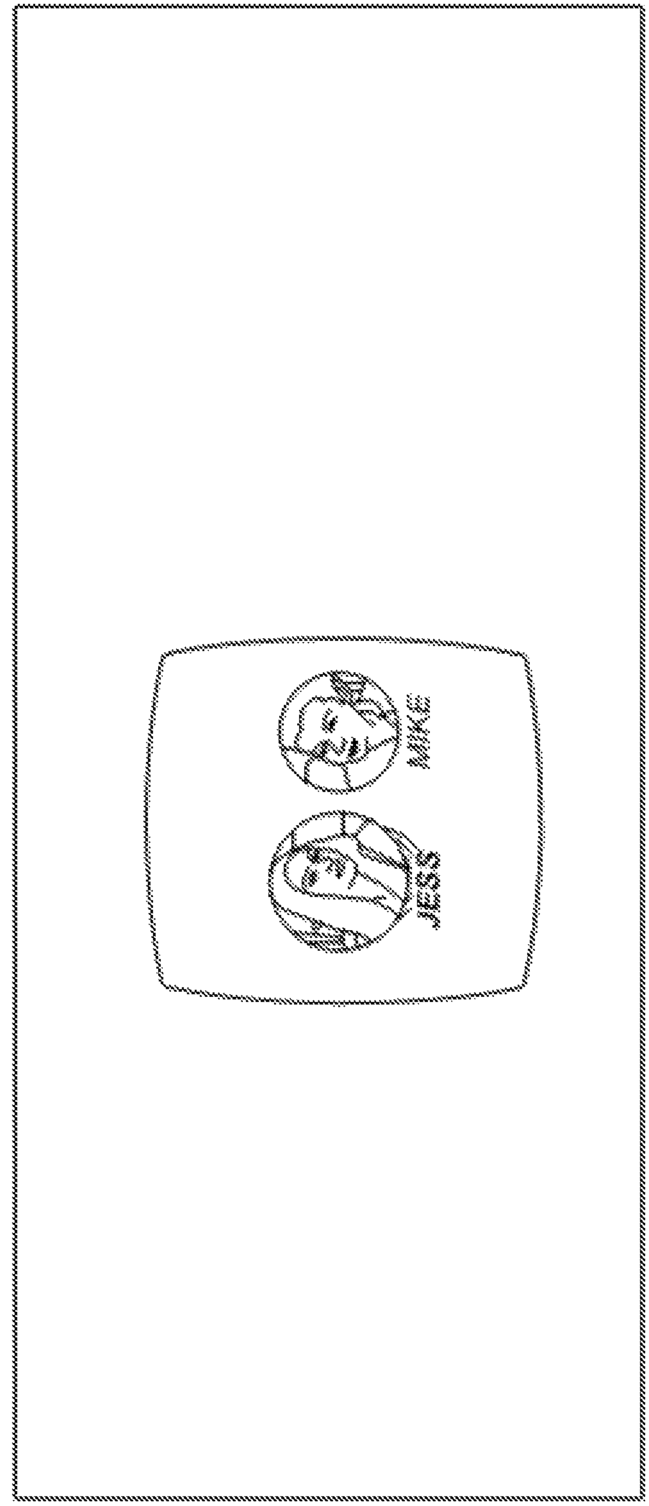

The video player 140 begins playback 426 of the second 360-degree media segment. In other embodiments, the annotation contains two or more annotation options. For example, in FIG. 5H, the video player 140 displays on the 360-degree display unit 150A an annotation asking Sean to choose whether to experience the distracted driving PSA from the perspective of Jess or Mike. In FIG. 5I, Sean provides user input indicating selection of the "Jess" annotation. The user selection module 122 interprets the input and directs the video player 140 to begin playback of the 360-degree media segment associated with the selected node.

Figure 5J:
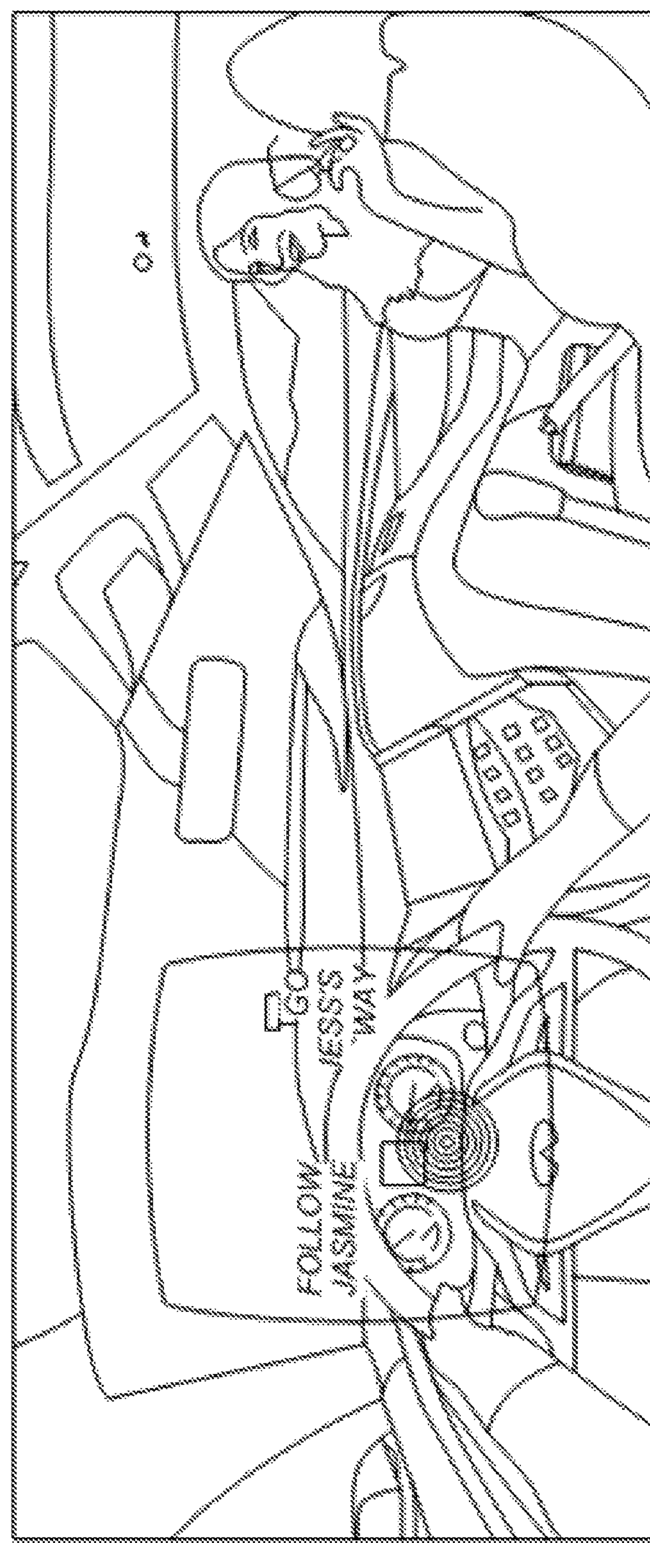
Figure 5K:
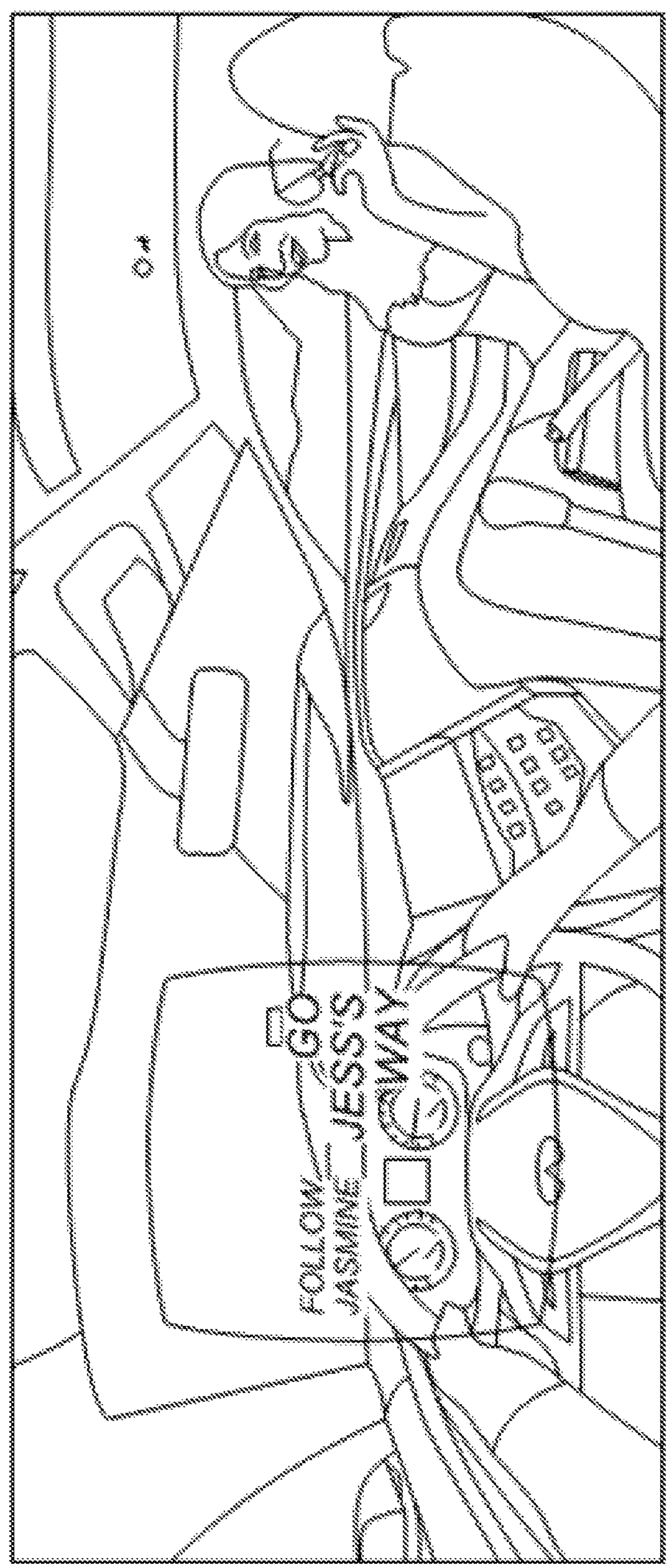
Figure 5L:
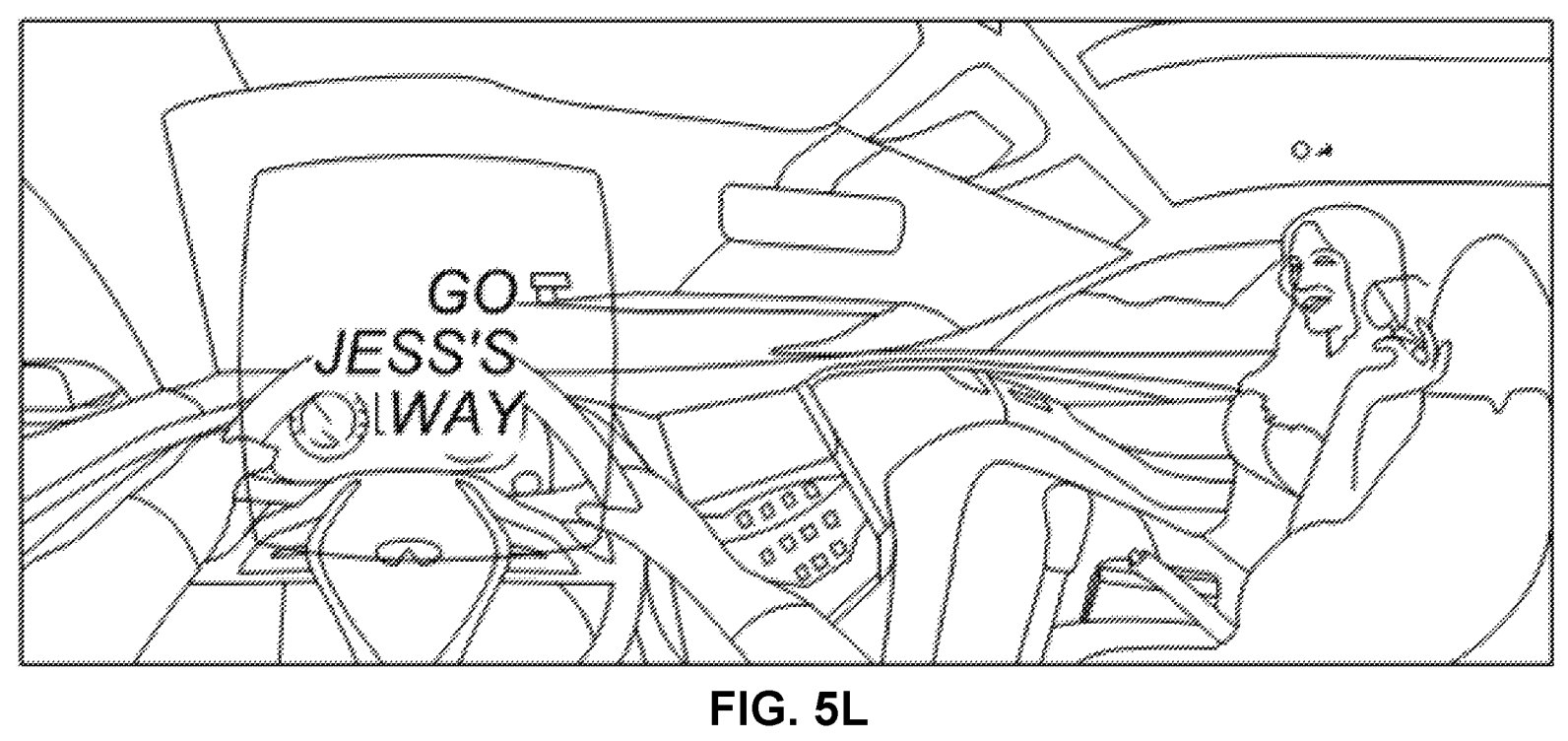

In FIG. 5J, the video player 140 begins playback of the third 360-degree media segment. Assuming Sean selected the "Mike" annotation, the video player 140 presents an annotation asking Sean to select whether to "Follow Jasmine" or "Go Jess's Way." In FIG. 5K, Sean provides user input, which the user selection module 122 interprets as selection of the "Go Jess's Way" node in FIG. 5L, directing the video player 140 to begin playback of the corresponding 360-degree media segment.

Figure 5M:
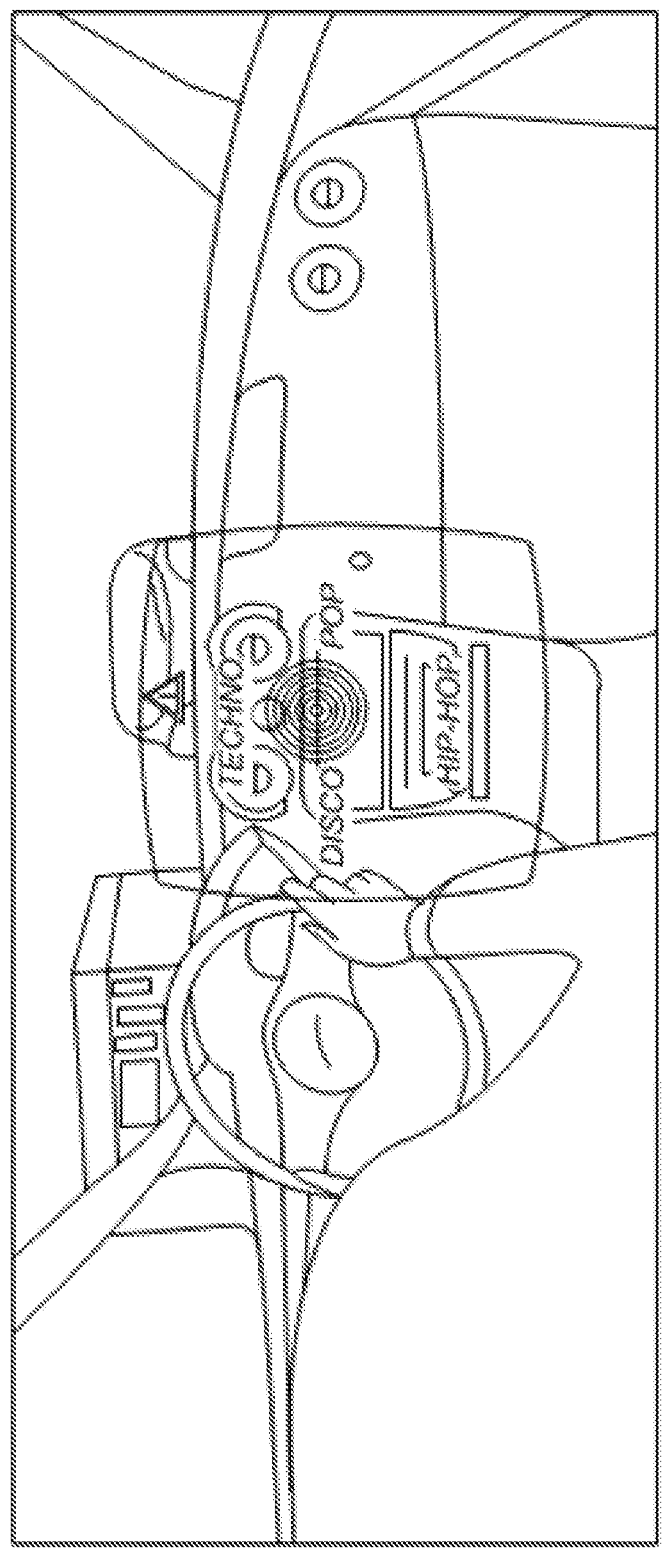
Figure 5N:
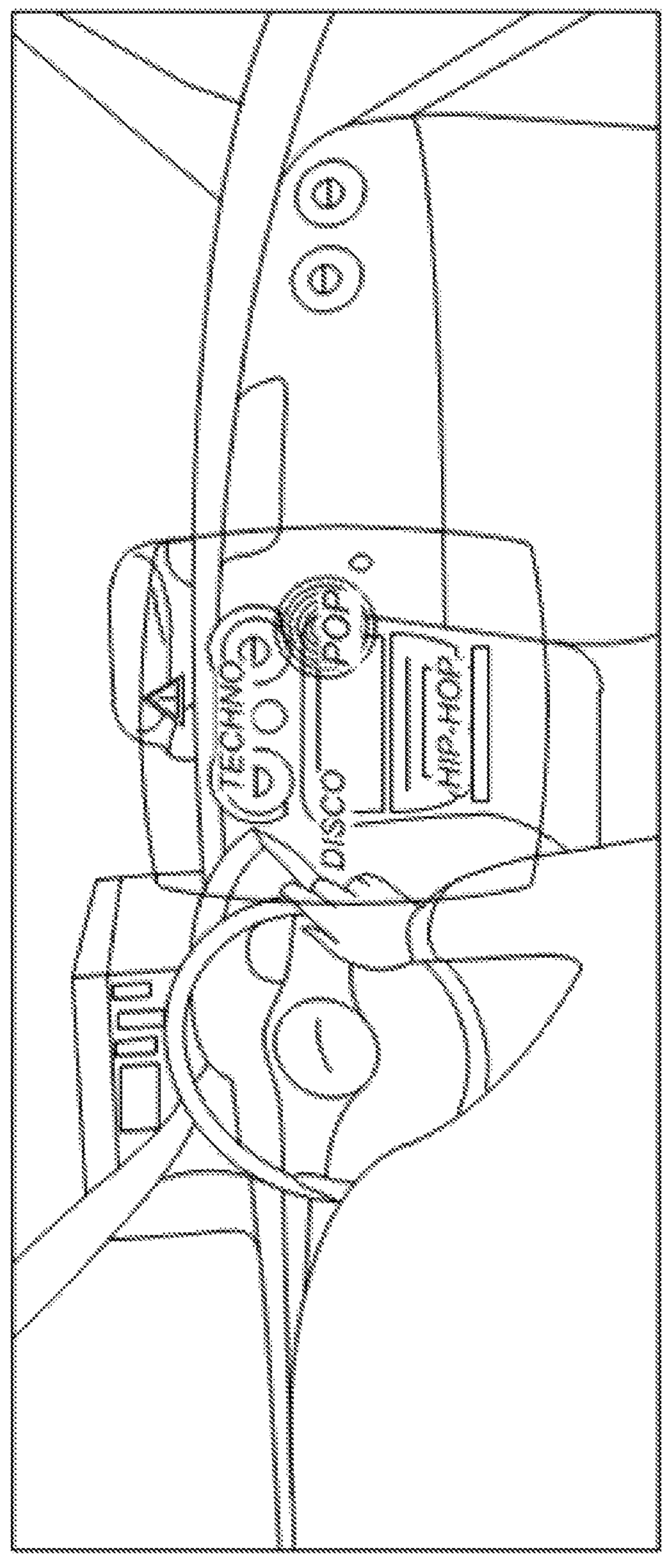
Figure 5O:
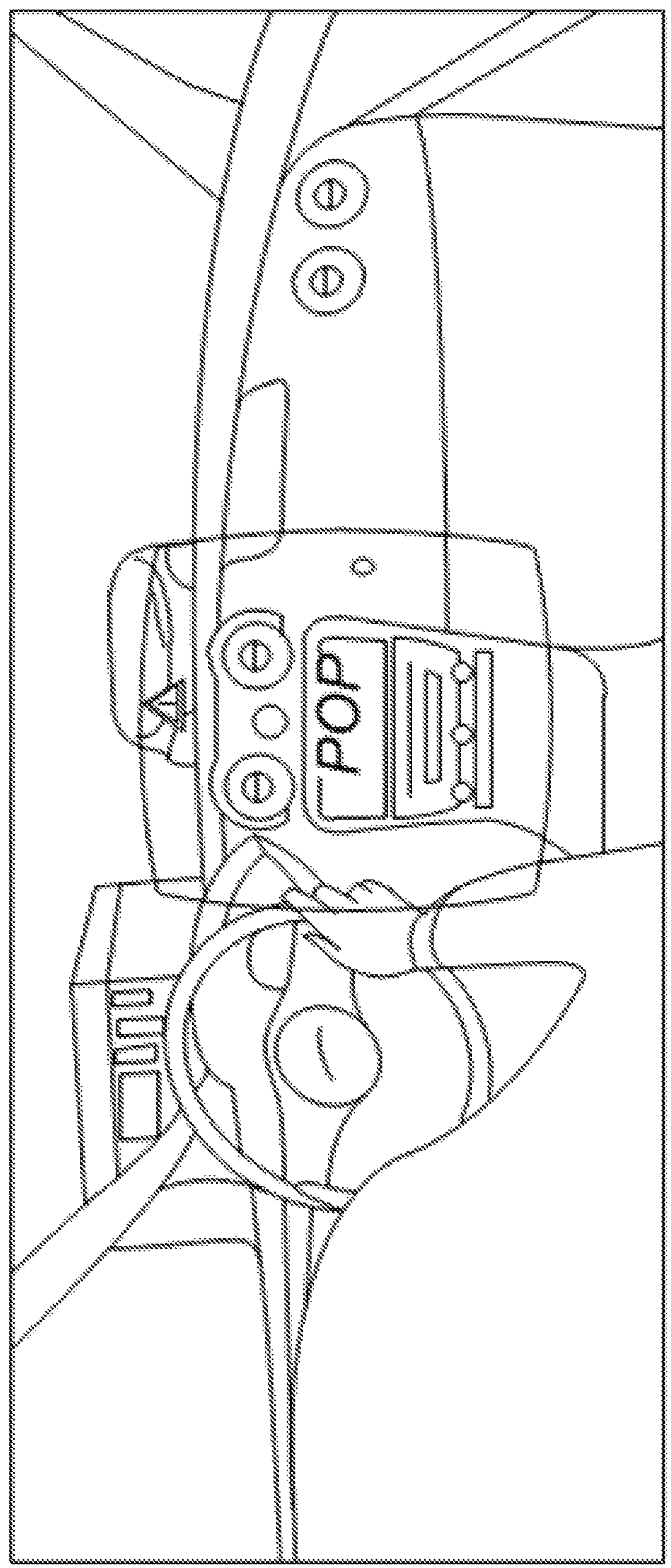

FIG. 5M illustrates a 360-degree media segment with four annotation options. Sean is asked to choose whether to play techno, pop, disco, or hip hop music. In FIG. 5N, Sean provides user input indicating selection of the "Pop" node in FIG. 5O. The user selection module 122 interprets the input and directs the video player 140 to play the 360-degree media segment corresponding to the selected node. In one embodiment, selection of an annotation option causes immediate playback of the entire 360-degree media segment associated with the selected option. In another embodiment, selection of an annotation option causes a delayed response such that the video player 140 delays playback of a portion of the 360-degree media segment. For example, while the video player 140 may begin playback of the 360-degree video file associated with Sean's selection of pop music, the video player 140 may delay playback of the corresponding audio file containing pop music for a specified period of time.

Figure 5P:
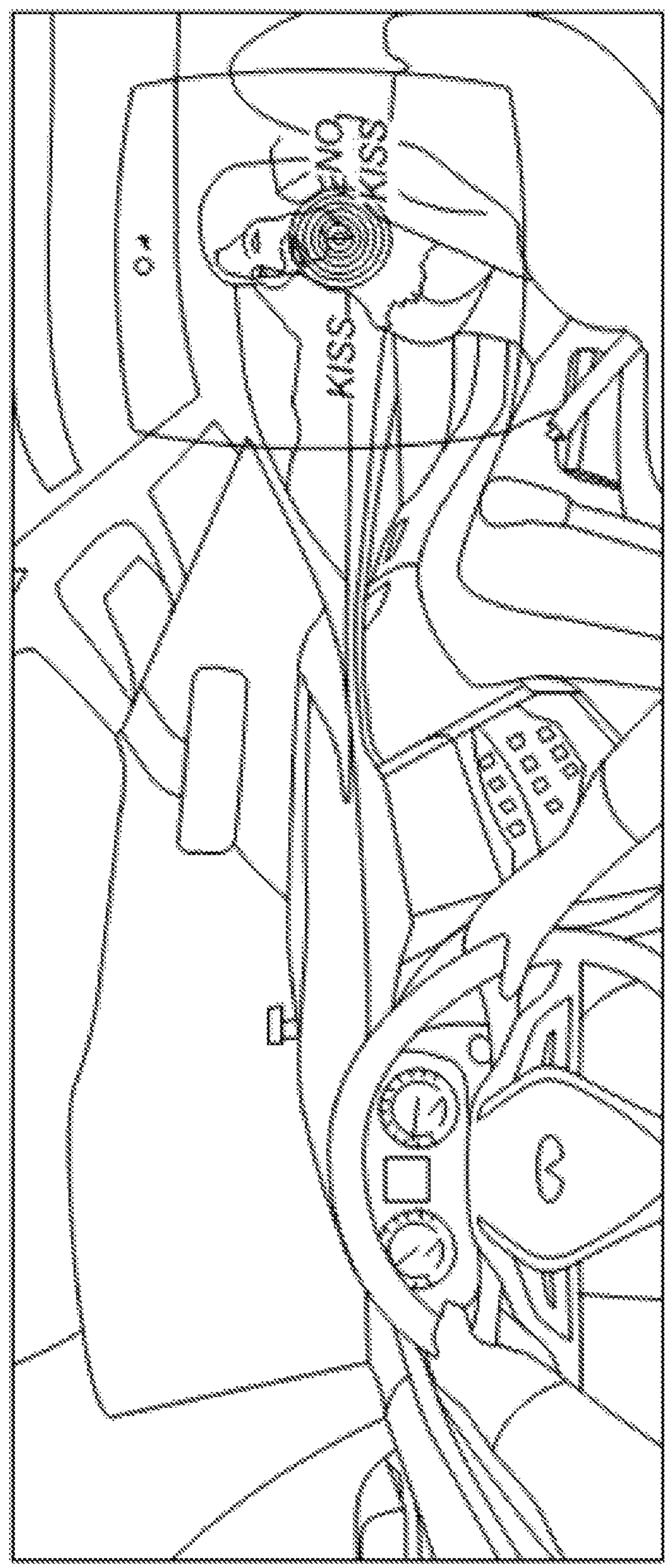
Figure 5Q:
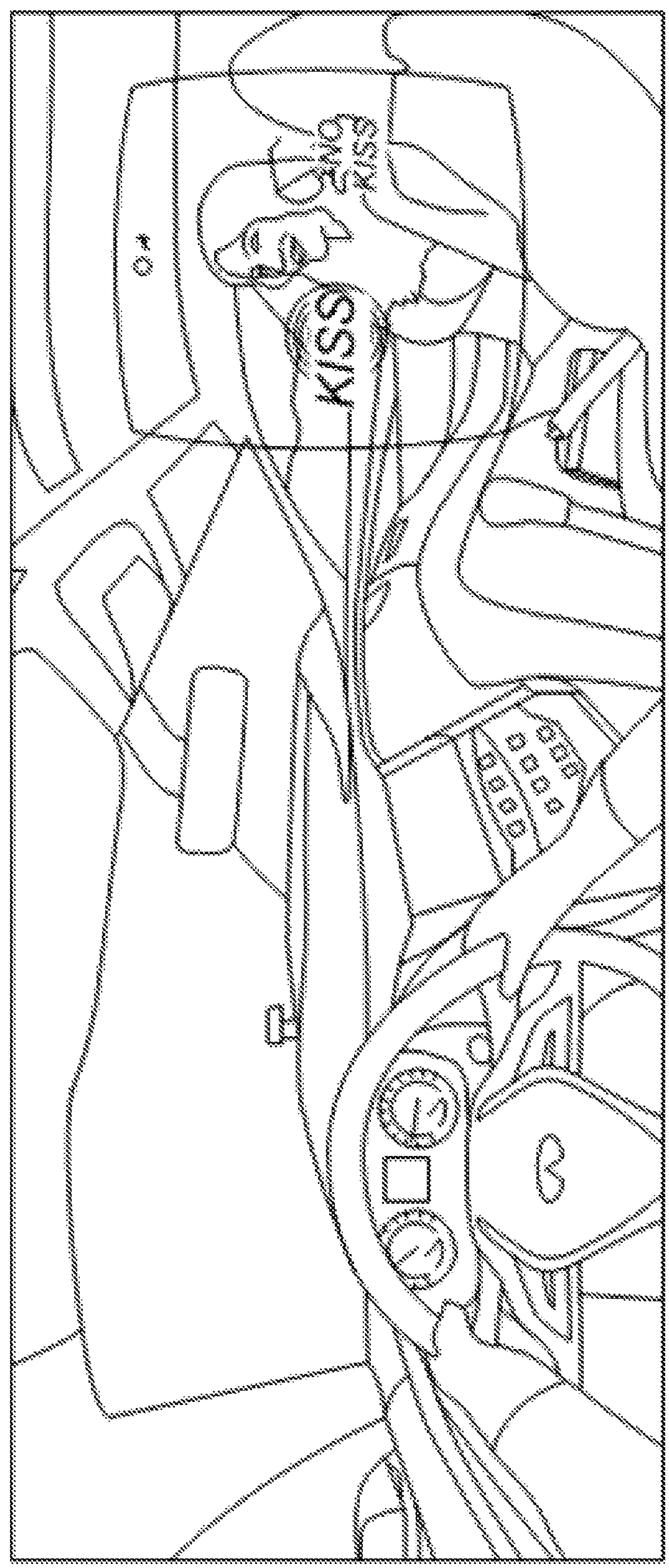

In some embodiments, users of both clients 110A and 110B are presented with an annotation and asked to select from the displayed annotation options. For example, in FIG. 5P, the video player 140 displays an annotation with two annotation options on the clients 110A and 110B. Both Sean and Alison are asked to choose between "Kiss" and "No kiss." In FIG. 5Q, Sean provides user input indicating selection of the "Kiss" node. However, because the third annotation requires input from both players, the user selection module 122 will not instruct the video player 140A to play the 360-degree media segment associated with the "Kiss" node unless Alison also chose the "Kiss" annotation option.

Figure 5R:
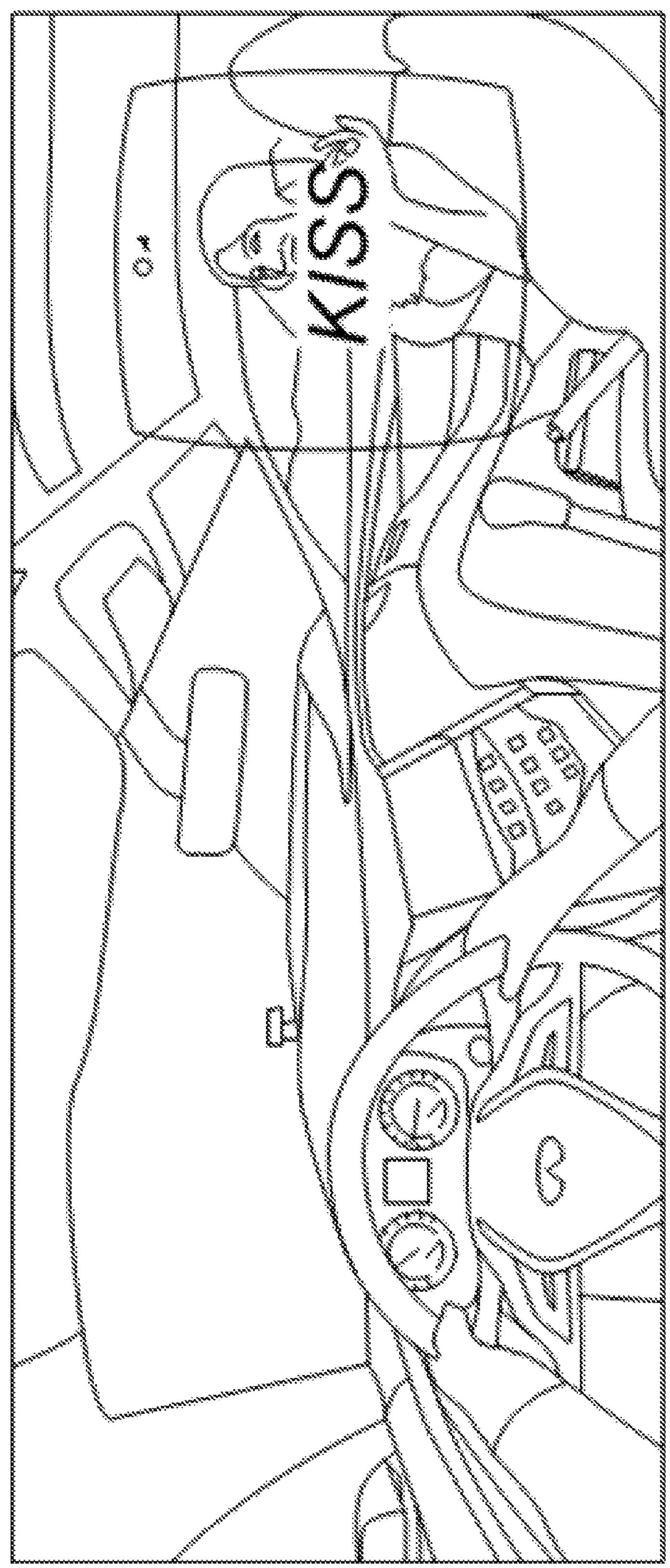

In FIG. 5R, the video player 140 displays selection of the "Kiss" annotation option, indicating that Alison also selected the "Kiss" annotation option. The client 110A receives a data packet from the client 110B indicating Alison's selection, and directs the video players 140A and 140B to playback the 360-degree media segments corresponding to the annotation selections of both players. Because the script tree contains multiple videos per node, the user selection module 122 will send a different video to each of clients 110A and 110B representing each player's perspective of the same event in the virtual reality experience.

Figure 5S:
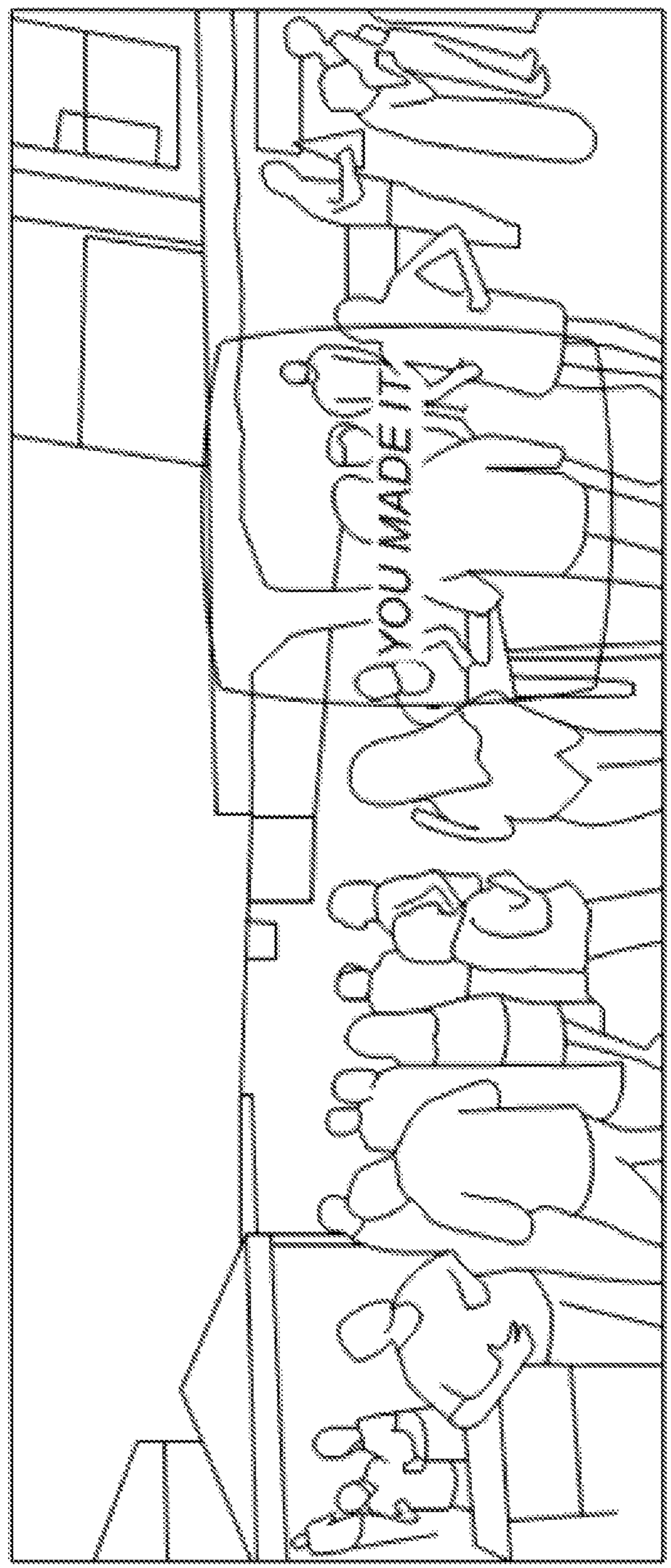

FIG. 5S concludes the distracted driving PSA. The video player 140 plays the final 360-degree media segment containing an annotation saying "You made it." The final annotation does not prompt Sean or Alison to choose from among multiple annotation options, but instead indicates the conclusion of the cooperative live action virtual reality experience.

Additional Considerations

The present invention has been described in particular detail with respect to various embodiments, and those of skill in the art will appreciate that the invention may be practiced in other embodiments. In addition, those of skill in the art will appreciate the following aspects of the disclosure. First, the particular naming of the components, capitalization of terms, the attributes, data structures, or any other programming or structural aspect is not mandatory or significant, and the mechanisms that implement the invention or its features may have different names, formats, or protocols. Second, the system may be implemented via a combination of hardware and software, as described, or entirely in hardware elements. Third, the particular division of functionality between the various system components described herein is merely exemplary, and not mandatory; functions performed by a single system component may instead be performed by multiple components, and functions performed by multiple components may instead performed by a single component.

Some portions of above description describe the invention in terms of algorithms and symbolic representations of operations on information. These algorithmic descriptions and representations are used by those skilled in the data processing arts to most effectively convey the substance of their work to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware or hardware.

In addition, the terms used to describe various quantities, data values, and computations are understood to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or the like, refer to the action and processes of a computer system, or similar electronic computing device, that manipulates and transforms data represented as physical (electronic) quantities within the computer system memories or registers or other such information storage, transmission or display devices.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method of creating a shared interactive gaming experience comprising:

sending, from a first client device to a server over a network, a request to begin the shared interactive gaming experience, the first client device associated with a first 360-degree display unit;

receiving, at the first client device, a response to the request, the response allowing the first client device to initiate the shared interactive gaming experience;

connecting with a second client device over the network to cooperate in the shared interactive gaming experience, the second client device associated with a second 360-degree display unit;

obtaining a first 360-degree video file and a first annotation associated with the first 360-degree video file from a video database of the server based on a script tree in the video database, wherein:

the script tree represents a plurality of flows of the shared interactive gaming experience, each flow comprising a plurality of nodes organized based on possible user inputs, each node corresponding to one or more 360-degree video files and associated annotations;

presenting the first 360-degree video file and the first annotation visually using the first 360-degree display unit of the first client device, the first annotation including one or more options for selection by a user of the first client device;

receiving, at the first client device, a user input selecting one of the one or more options associated with the first annotation, wherein the user input results from motion of the first 360-degree display unit when the user of the first 360-degree display unit moves to select the one of the one or more options associated with the first annotation;

obtaining a second 360-degree video file and an associated second annotation that correspond to a subsequent node in the script tree for the first client device, wherein the subsequent node is determined based on the received user input of the first client device and a user input of the second client device for the first annotation; and presenting the second 360-degree video file and the second annotation visually using the first 360-degree display unit of the first client device while the second 360-degree display unit of the second client device is simultaneously presenting a third 360-degree video file and an associated third annotation that also correspond to the subsequent node in the script tree, wherein the second 360-degree video file and the third 360-degree video file provide the shared interactive experience from different perspectives.

2. The method of claim 1, wherein each of a plurality of nodes of the logic tree contains at least one node that precedes it and at least one node that follows it.

3. The method of claim 1, further comprising presenting a fourth 360-degree video file and a fourth annotation visually using the first 360-degree display unit of the first client device responsive to user input by the first client device in response to the second 360-degree video file and the second annotation.

4. The method of claim 3, wherein a node of the script tree contains two or more outbound nodes, each outbound node associated with a choice to be made by one or more users.

5. The method of claim 1, wherein a plurality of nodes of the logic tree contain multiple 360-degree video files and wherein a different 360-degree video file is presented to each client at each of the plurality of nodes of the script tree.

6. The method of claim 1, further comprising:

presenting a fourth 360-degree video file and a fourth annotation visually using the first 360-degree display unit of the first client device responsive to user input by the first client device in response to the second 360-degree video file and second annotation;

receiving a user input in response to the fourth annotation; and presenting the first 360-degree video file and the first annotation visually using the first 360-degree display unit of the first client device responsive to the received user input in response to the fourth annotation.

7. The method of claim 1, wherein the second 360-degree video file and the second annotation are accessed for the first client device based on the user of the first client device having elected to be the first player and wherein the third 360-degree video file and the third annotation are accessed for the second client device based on the user of the second client device having elected to be the second player.

8. The method of claim 1, wherein the second and third annotations are the same.

9. The method of claim 1, wherein the second and third annotations are different.

10. A computer system, comprising:

memory; and one or more processors, coupled to the memory, to:

send, from a first client device to a server over a network, a request to begin a shared interactive gaming experience, the first client device associated with a 360-degree display unit;

receive, at the first client device, a response to the request, the response allowing the first client device to initiate the shared interactive gaming experience;

connect with a second client device over the network to cooperate in the shared interactive gaming experience, the second client device associated with a second 360-degree display unit;

obtain a first 360-degree video file and a first annotation associated with the first 360-degree video file from a video database of the server based on a script tree in the video database, wherein:

the script tree represents a plurality of flows of the shared interactive gaming experience, each flow comprising a plurality of nodes organized based on possible user inputs, each node corresponding to one or more 360-degree video files and associated annotations;

present the first 360-degree video file and the first annotation visually using the first 360-degree display unit of the first client device, the first annotation including one or more options for selection by a user of the first client device;

receive, at the first client device, a user input selecting one of the one or more options associated with the first annotation, wherein the user input results from motion of the first 360-degree display unit when the user of the first 360-degree display unit moves to select the one of the one or more options associated with the first annotation;

obtain a second 360-degree video file and an associated second annotation that correspond to a subsequent node in the script tree for the first client device, wherein the subsequent node is determined based on the received user input of the first client device and a user input of the second client device for the first annotation; and present a second 360-degree video file and the second annotation visually using the first 360-degree display unit of the first client device while the second 360-degree display unit of the second client device is simultaneously presenting a third 360-degree video file and an associated third annotation that also correspond to the subsequent node in the script tree, wherein the second 360-degree video file and the third 360-degree video file provide the shared interactive gaming experience from different perspectives.

11. The system of claim 10, wherein each of a plurality of nodes of the script tree contains at least one node that precedes it and at least one node that follows it.

12. The system of claim 10, wherein a plurality of nodes of the script tree contain multiple 360-degree video files and wherein a different 360-degree video file is presented to each client at each of the plurality of nodes of the logic tree.

13. The system of claim 10, wherein the one or more processors further to:

present a fourth 360-degree video file and a fourth annotation visually using the first 360-degree display unit of the first client device responsive to user input by the first client device in response to the second 360-degree video file and the second annotation;

receive a user input in response to the fourth annotation; and present the first 360-degree video file and the first annotation visually using the first 360-degree display unit of the first client device responsive to the received user input in response to the fourth annotation.

14. A non-transitory computer-readable medium storing computer-executable instructions that, in response to execution, cause a device comprising a processor to perform operations, comprising:

sending, from a first client device to a server over a network, a request to begin a shared interactive gaming experience, the first client device associated with a 360-degree display unit;

receiving, at the first client device, a response to the request, the response allowing the first client device to initiate the shared interactive gaming experience;

connecting with a second client device over the network to cooperate in the shared interactive gaming experience, the second client device associated with a second 360-degree display unit;

obtaining a first 360-degree video file and a first annotation associated with the first 360-degree video file from a video database of the server based on a script tree in the video database, wherein:

the script tree represents a plurality of flows of the shared interactive gaming experience, each flow comprising a plurality of nodes organized based on possible user inputs, each node corresponding to one or more 360-degree video files and associated annotations;

presenting the first 360-degree video file and the first annotation visually using the first 360-degree display unit of the first client device, the first annotation including one or more options for selection by a user of the first client device;

receiving, at the first client device, a user input selecting one of the one or more options associated with the first annotation, wherein the user input results from motion of the first 360-degree display unit when the user of the first 360-degree display unit moves to select the one of the one or more options associated with the first annotation;

obtaining a second 360-degree video file and an associated second annotation that correspond to a subsequent node in the script tree for the first client device, wherein the subsequent node is determined based on the received user input of the first client device and a user input of the second client device for the first annotation; and presenting a second 360-degree video file and the second annotation visually using the first 360-degree display unit of the first client device while the second 360-degree display unit of the second client device is simultaneously presenting a third 360-degree video file and an associated third annotation that also correspond to the subsequent node in the script tree, wherein the second 360-degree video file and the third 360-degree video file provide the shared interactive gaming experience from different perspectives.

15. The storage medium of claim 14, wherein each of a plurality of nodes of the script tree contains at least one node that precedes it and at least one node that follows it.

16. The storage medium of claim 14, wherein a plurality of nodes of the script tree contain multiple 360-degree video files and wherein a different 360-degree video file is presented to each client at each of the plurality of nodes of the script tree.

17. The storage medium of claim 14, further comprising instructions for:

presenting a fourth 360-degree video file and a fourth annotation visually using the first 360-degree display unit of the first client device responsive to user input by the first client device in response to the second 360-degree video file and the second annotation;

receiving a user input in response to the fourth annotation; and presenting the first 360-degree video file and the first annotation visually using the first 360-degree display unit of the first client device responsive to the user input in response to the fourth annotation.

* * * * *